United States Patent [19]

Roux et al.

[11] Patent Number: 5,231,696
[45] Date of Patent: Jul. 27, 1993

[54] PROCESS AND CIRCUITRY FOR IMPLEMENTING PLOTTING OF OVEREXTENDING CURVES INSIDE A DISPLAY WINDOW

[75] Inventors: Catherine Roux; Jean-Claude Rahuel, both of Rennes, France

[73] Assignees: France Telecom; Telediffusion de France, both of Paris, France

[21] Appl. No.: 672,790

[22] Filed: Mar. 21, 1991

Related U.S. Application Data

[63] Continuation of Ser. No. 192,986, May 12, 1988, abandoned.

[30] Foreign Application Priority Data

May 14, 1987 [FR] France .................. 87 06796

[51] Int. Cl.$^5$ .................. G06F 15/68; G06F 15/72
[52] U.S. Cl. .................. 395/134; 395/133; 340/124; 340/730; 340/747
[58] Field of Search ... 364/200 MS File, 900 MS File, 364/521, 522, 518; 340/747, 750, 724, 703, 730; 382/46, 47, 56; 395/133, 134

[56] References Cited

U.S. PATENT DOCUMENTS

| | | | |
|---|---|---|---|
| 4,272,808 | 6/1981 | Hartwig | 374/718 |
| 4,674,059 | 6/1987 | Schrieber | 364/523 |
| 4,716,404 | 12/1987 | Tabata et al. | 340/723 |
| 4,755,955 | 7/1988 | Kimura et al. | 364/518 |
| 4,785,391 | 11/1988 | Apley et al. | 364/518 |
| 4,805,117 | 2/1989 | Fiore et al. | 364/518 |
| 4,821,209 | 4/1989 | Hempel et al. | 364/518 |

FOREIGN PATENT DOCUMENTS 0160306 11/1985 European Pat. Off.
60-220473 11/1985 Japan.

OTHER PUBLICATIONS

Proceedings IECON '84; International Conference on Industrial Electronics, Control & Inst.; Oct.22-26, 1984; vol. 1, pp. 429-431.

*Primary Examiner*—Phu K. Nguyen
*Attorney, Agent, or Firm*—Wegner, Cantor, Mueller & Player

[57] ABSTRACT

The process concerns the plotting of overextending curves inside a limited display window, with cutting-off of the parts of the curve which extend beyond the imposed display window. The goal is to provide a process for the plotting of overextending curves inside a display window, which optimizes calculation time and plotting time. This goal is achieved by means of a process characterized in that it manages a first process for plotting, applicable to the portions of curves (55) inscribed inside the window, and a second distinct process for processing of the overextending parts (54) of the curve, in that the processing of the overextending parts consists in optimizing travel (51, 52, 53) along the projection of the overextending parts on the window border ($X_{max}$, $Y_{max}$), and in that the said processing process is entirely executed within the plotting process, and in the course of the plotting of the curve.

12 Claims, 7 Drawing Sheets

PROCESS AND CIRCUITRY FOR IMPLEMENTING PLOTTING OF OVEREXTENDING CURVES INSIDE A DISPLAY WINDOW

This application is a continuation of U.S. application Ser. No. 07/192,986, filed May 12, 1988, now abandoned.

The invention concerns a process for plotting of curves, notably intended to be implemented in a graphics terminal or videographic terminal. More precisely, the process in accordance with the invention concerns the plotting of overextending curves inside a limited display window, with cutting-off or clipping of the parts of the curve which extend beyond the imposed display window.

The invention likewise concerns the circuits for implementation of the process, notably in the form of a wired logic or an integrated circuit.

Processes for plotting of curves with cutting-off of the overextending parts are already known. Among these processes, the one which comes immediately to mind consists in identifying, before plotting, the points of intersection of the curve with the boundaries of the window. Then, during the plotting operation, the apparatus refrains from acting in the overextending parts bounded by the previously identified points of intersection.

FIG. 1 illustrates the implementation of this known process in the case of the plotting of a "crescent moon" 10 extending beyond a rectangular window 13. The "crescent moon" 10 consists of two arcs of a circle 11, 12, overstepping the window 13 at a certain number of points of intersection ($p_2$, $p_3$, $p_4$, $p_5$, $p_7$, $p_8$). During the plotting operation, the process consists in calculating in an incremental manner the set of points of the curve, including the points of the overextending parts, while actually plotting only the parts inscribed inside the window and identified by the meeting of the previously calculated points of intersection.

Now, this known process presents numerous drawbacks essentially owing to the fact of the constraints of memory capacity, as well as of the duration and complexity of processing, which it imposes on plotting devices.

In fact, plotting devices generally work from display lists containing the characteristics of the curve to be plotted, namely the algebraic equation and/or the characteristic points and parameters of each of the simple geometric portions that make up the curve.

The analysis of the display list in advance, and the storage in memory of each of the points of intersection of the curve with the boundaries of the window, therefore make it necessary on the one hand to burden the contents of the display list with the found new values, with the supplementary drawback of using a new, different working list each time that the window parameters change or the position of the moving curve changes in a fixed window (animation).

Another process, likewise unfavorable particularly in regard to the memory capacity of the plotting device, consists in calculating all the points of the curve, including the points in overextension, and in storing them in a memory that would be only partially displayed at any given moment; this process does not deal in an optimum manner with the problem of animation.

Another process, likewise unfavorable particularly in regard to the processing times linked with calculation, consists in calculating all the points of the curve and eliminating all those that are situated outside the limits.

This process is likewise unfavorable in regard to the method of filling-in of plotted areas [ . . .]¹

¹[Translator's Note: Sentence appears, without final period, at the end of a page.]

The process for plotting of curves under the present invention has as its object to remedy all these drawbacks.

More exactly, a first object of the invention is to provide a process for plotting of overextending curves inside a display window that optimizes the calculation time and plotting time. This aim notably consists in providing a process that reduces to the minimum the calculation operations performed on the parts in overextension, by substituting for the plotting process applicable to the parts inscribed inside the window, a second different process for the processing of the overextending parts.

Another object of the invention is to provide a process for plotting and for cutting-off of curves which does not imply modifications of the display lists, notably in such a way as to limit the required memory capacity, and to make it possible to deal easily with problems of animation.

A supplementary object of the invention is to provide such a process for plotting which is quite specifically adapted to the plotting of first- and second-degree linear-equation curves, using equipment having a simple architecture. The process is likewise applicable to curves constituted by the continuous chaining of simple first- and second-degree geometric portions.

Another object of the invention is to provide a process which closes the overextending outlines by "crushing or projecting" them along the border of the display window, in such a way as to be compatible with a simple process for filling-in of the outlines.

To this end, an essential inventive object of the invention, ensuring a minimization of the required capacities for memory and processing, is to renounce the point-by-point following of the overextending parts of the curve in order to identify the return of the curve inside the window, using instead a set of simple criteria that make it possible to localize only the pertinent zone bounded by the crushed plotting at the window border.

Thus the "crushed" plotting that runs along the window border is not performed by point-by-point projection of the overextending curve; on the contrary, from the moment of overextension, the process generates the "crushed" plotting (i.e., it follows the window border) in an automatic manner, independently of the real value of the curve in overextension. In this way, the process takes into account only the value of the few simple criteria chosen, in order to control the direction of travel along the border and the conditions for return of the plotting inside the window. The crushed plotting thus is performed "blind" in a certain sense, which avoids the machine cost (processing time and memory space) that would be entailed by a uselessly precise localization of the actual curve in overextension.

These objectives as well as others which will appear below are achieved with the assistance of a process for plotting of overextending curves inside a display window, notably intended for the plotting of curves consisting of simple first- and second-order geometric portions (straight lines, circles, ellipses, . . . ) by graphics terminals and videographic terminals, a process of the type consisting in defining each curve by a display list identifying notably the nature (for example the algebraic equation) and/or the type and characteristic theoretical points of each of the said simple geometric portions, then in performing point by point, in an incremental manner, the plotting of the parts of the curve that do not extend beyond the display window.

[ ... ][1] process characterized in that it manages a first process for plotting, applicable to the portions of curves inscribed in the window, and a second distinct process for processing of the overextending parts of the curve,

[1][Translator's Note: Punctuation and capitalization of this and the following two paragraphs are taken directly from the original.]

in that the said processing of the overextending parts consists in optimizing travel along the projection of the overextending parts on the window border, and in that the said processing process is entirely executed within the plotting process, and in the course of the plotting of the curve.

In accordance with the invention, the said first process for incremental plotting of the curve inside the window consists in calculating each new point in an iterative manner, by applying precalculated increments dx and/or dy to the current point, in such a way as to obtain three possible incrementation configurations to determine the new point to be plotted, then in selecting, from among the three possible points, the point closest to the curve in accordance with the Jordan method, with automatic advance elimination of one of the incrementation configurations by means of the Bresenham method supplemented by the taking into account of the direction of travel D along the curve, and of the current quadrant.

These two methods, previously known but, it seems, never yet associated, will be presented further on.

In accordance with another essential characteristic of the invention, the said second process for processing of the overextending parts of the curve consists in causing the plotting to travel along the window border, by increments independent of the theoretical values of the overextending curve, as long as a threshold for the stopping, retrogression, or return of the curve into the window has not yet been reached.

The logic for this process furthermore accepts outlines located entirely outside the window, which is useful for the cases in which it would be disadvantageous, in terms of the duration and complexity of processing, to identify these outlines in advance.

In accordance with an advantageous characteristic of the invention, the said retrogression threshold is verified as a function of the orientation of the concavity of the curve at the window border, of the position of the current point inside or outside the curve, of the coordinate in overextension, and of the relative position of the current point and the final point. The idea of using these criteria, and their choice (as described here, or the equivalent) permits a considerable processing economy because it avoids the point-by-point following of the overextending parts, limiting the processed information to what is strictly necessary for the closing of the outline and the resumption of plotting inside the window. Operating "blind" corresponds furthermore to the fact that one reduces as much as possible the number of transitory variables that permit the device to know its instantaneous plotting position. As will be seen further below, a considerable savings is likewise realized, thanks to this process, in the event of a crushing of the overextending parts on a corner of the window.

In accordance with the invention, the process thus described is particularly adapted to its implementation in the form of a wired logic.

Other characteristics and advantages of the invention will appear from the following reading of a preferred manner of embodiment of the invention, given purely by way of illustration, and from the attached drawings in which.

The manner of embodiment of the invention described below refers specifically to the plotting of curves, overextending or not overextending, consisting of straight lines, circles, straight ellipses, portions of these geometric figures, and/or chainings of these portions, forming outlines or not.

However, of course, the object of the invention is not limited to the processing of these figures.

Figure 2B:
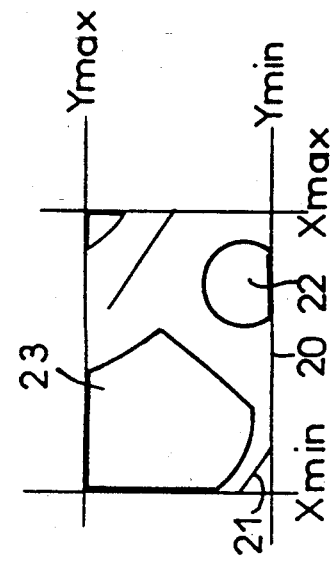
FIGS. 2A, 2B illustrate respectively the positioning of the display window with regard to overextending curves, and the plotting actually obtained in the window.
Figure 1:
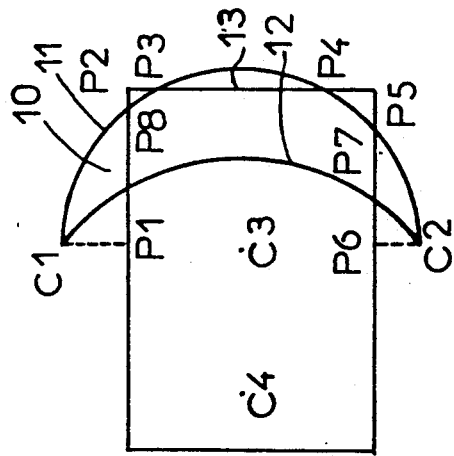
FIG. 1 represents the principle of operation of a known process described in the preamble.
Figure 2A:
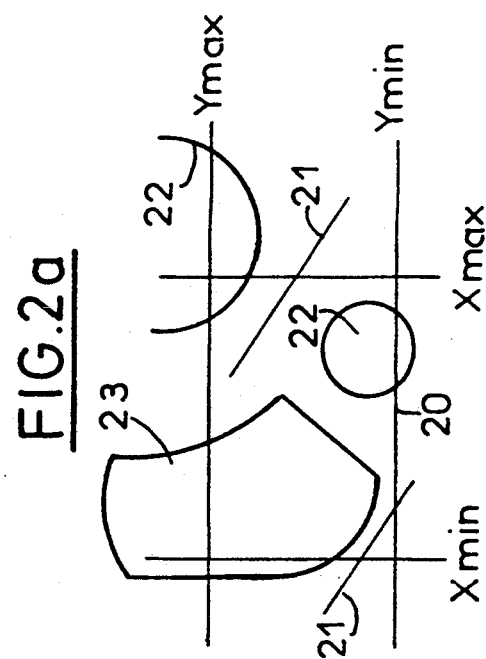

In FIG. 2A, the window 20 is applied on a geometric landscape and defined by four straight lines $X_{min}$, $X_{max}$, $Y_{min}$ and $Y_{max}$ which constitute its border.

The geometric figures of the landscape to be displayed comprise for example segments of a straight line 21, circles or arcs of circles 22, as well as a complex outline 23 consisting of chained straight, circular and elliptical portions.

As will be noted in FIG. 2B, the process for plotting according to the invention permits one to ensure the display of only the parts of curves inscribed inside the window 20, with closure, along the window border, of the overextending outlines.

These manners of embodiment correspond for example to the representation of graphs on cathode screens or plotting tables, or again to the display of a geometric landscape, animated or not, via a display window that is fixed or mobile with regard to the landscape.

The graphic or videographic representation of curves is on the other hand assumed to be implemented in the form of a succession of points corresponding for example to the pixels of a cathode screen. In the case of an application to plotting tables, the device integrates, if applicable, the curve by joining the different calculated points.

Figure 4B:
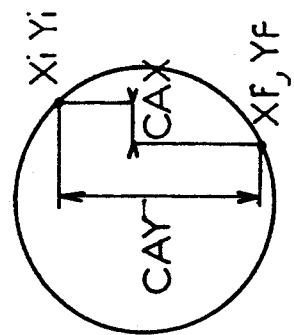
FIGS. 4a, 4b illustrate the use of the stopping criterion in accordance with the invention.
Figure 4A:
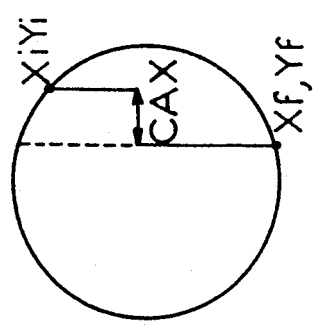
Figure 3:
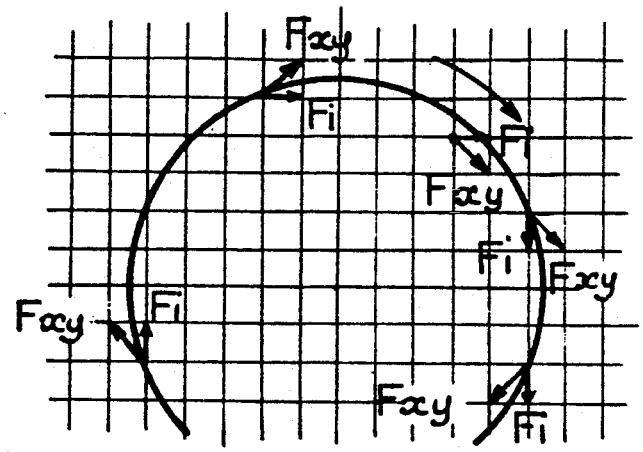
FIG. 3 illustrates the implementation of the methods of Jordan and Bresenham for the plotting of parts of curves inscribed inside the display window.

FIGS. 3, 4A and 4B will make it possible in a first instance to present the process for plotting of the portions of curves inscribed inside the window, in accordance with the process under the invention.

This process consists in the combined implementation on the one hand of a method of selecting, for each plotting step, the point or pixel closest to the theoretical curve, from among a set of three possible ones, taking into account on the other hand, in the case of the circle or ellipse, the zone of the curve where the current point is situated.

The method for selecting the new current point from among three points is directly derived from the method presented in the article of B. W. Jordan, W. J. Lennon and B. D. Holm, "An improved algorithm for the generation of non parametric curves," IEEE Transaction on Computer [sic] Vol. C-22, No. 12, December 1973. (It will simply be mentioned that this method consists in calculating the three possible values for the new current point of the curve being plotted, that correspond to an incrementation by dx only, by dy only, and by dx, dy simultaneously.) From among these values, one chooses the one corresponding to the point whose coordinates $(x+dx; y+dy)$ minimize the equation $ax^2+by^2+cxy+dx+ey+f$, i.e., to the one of the possible points that is located closest to the curve.

The second method which is combined, in accordance with the invention, with Jordan's method, consists in eliminating in advance, in a systematic manner, one of the two possibilities (dx or dy) in such a way as to economize the corresponding calculation of the value of the function. In fact, among the three directions of plotting corresponding to the three possible new current points, only two are immediately adjacent to the direction of the tangent to the point of the curve closest to the current point, and the third can therefore be eliminated.

A method for selection is known, described by J. E. Bresenham, "A linear algorithm for incremental digital display of circular arcs," Communication of the ACM, February 1977, Vol. 20, No. 2. (The described method consists in using the sign of the function at the points corresponding to an incrementation by dx only and by dy only, respectively, to determine which of the two functions $F_x=F(x+dx,y)$ and $F_y=F(x, y+dy)$ will be calculated, with $F_{xy}=F(x+dx, y+dy)$ which must always be calculated.) However, the described method does not take into account the variations in sign of the increments as a function of the position of the current point on a circle or an ellipse. The process in accordance with the invention thus completes this method by executing the choice of the function to be calculated $F_x$ or $F_y$ as a function of the sign of $F_{xy}$, of the direction D of travel along the circle or ellipse, and of the sign of the two partial derivatives with respect to x and with respect to y. The sign of the two partial derivatives makes it possible, in fact, to determine that one of the four quadrants sharing the plotting plane of the circle in which the current point is situated. (Each of the quadrants corresponds to one of the four possible combinations for the couple formed by the two signs (SDFX, SDFY) of the partial derivatives (DFX, DFY) of the curve.)

Consequently, if the function $F_{xy}$ is strictly positive, that is to say if the point (x+dx, y+dy) is outside the curve, the second function to be calculated is the function $F_i$ (i=x or y) which corresponds to a displacement tending to move toward the inside of the curve, in the quadrant under consideration; the choice is the inverse in the case where the function $F_{xy}$ is negative. Finally, if the function $F_{xy}$ is zero, it is the point (x+dx, y+dy) that is taken for the plotting of the new current point, since it is situated exactly on the theoretical curve.

It will be noted that the choice of the function $F_i$ to be calculated may likewise be executed, according to another suggestion of Bresenham, working from the test of a variable representing the addition of $F_{xy}$ and $F_i$.

The association of the method of Jordan, and the method of Bresenham improved in the manner just presented, furthermore necessitates a certain number of adaptations to allow a processing of certain limit cases. Essentially this involves on the one hand the management of the passage from one quadrant to an adjacent quadrant, and on the other hand the development of a stopping criterion for the plotting.

It should be pointed out that the quadrants are defined by the set of the four combinations that may be assumed by the couple of signs of the partial derivatives of the function. Now, the use of the sign of the partial derivatives, and of the direction of travel D along the curve, to determine the value of the two increments dx, dy, is not sufficient when one or the other of the derivatives is zero. In fact, when located on an extremum, one of the increments is independent of the direction and sign of the partial derivatives, and depends only on the extremum that is met.

The listing of the simulation software presented further below shows one of the possible solutions for resolving the ambiguity, namely the introduction of a supplementary logical test (DFX=0; DFY=0) taking into account the case in which one or the other of the partial derivatives is zero (see Table II, A).

FIGS. 4A, 4B illustrate the manner in which the process according to the invention solves the problem of the stopping criterion for the plotted curve.

In accordance with Jordan's method, the algebraic equation of the curve to be plotted is initialized to 0, which amounts to saying that the first plotted point belongs systematically to the theoretical curve. Under these conditions, there is little chance that the last calculated point of the portion of the curve to be plotted will be the same as the theoretical final point. If one transposes this principle of initialization to the process for plotting according to the invention, two problems arise.

First of all, the stopping criterion would only be able to be executed along a unique privileged direction, where overstepping a threshold indicates a passing beyond the theoretical final point. Now, this is not sufficient to eliminate doubt so as to determine, in the case of closed curves (notably circles), which of the two points of the curve having the same abscissa resp. coordinate has been overstepped. This would imply a supplementary test as to the quadrant where the current point is located.

On the other hand, the major defect of the method is that it does not imply passing through the final point, and thus does not ensure continuous chaining between several concatenated portions of curves.

In accordance with the invention, and as illustrated by the simulation presented in Tables I to VI, the problem of the stopping criterion is solved by initializing the algebraic equation for the portion of the curve being plotted to a value that causes passage through the final point; for this, one calculates the value of the algebraic equation while taking into account that the value of the function at the theoretical final point is zero (see Table III$_B$.2).

Furthermore, for verification of the stopping criterion, it is necessary to supply two supplementary items of information, which are the measurements of the excursions in number of increments (for example in pixels) between the point of departure and the point of arrival, on the two coordinates (CAX=$x_i$-$x_f$, CAY=$y_i$-$y_f$, the index i representing the current point and the index f representing the theoretical final point). In the course of plotting, the measurement variables CAX and CAY are managed like the coordinates associated with them, and follow the same rules for incrementation and decrementation (see for example Table V$_0$ (a), (b), (c), (d)).

Figure 8:
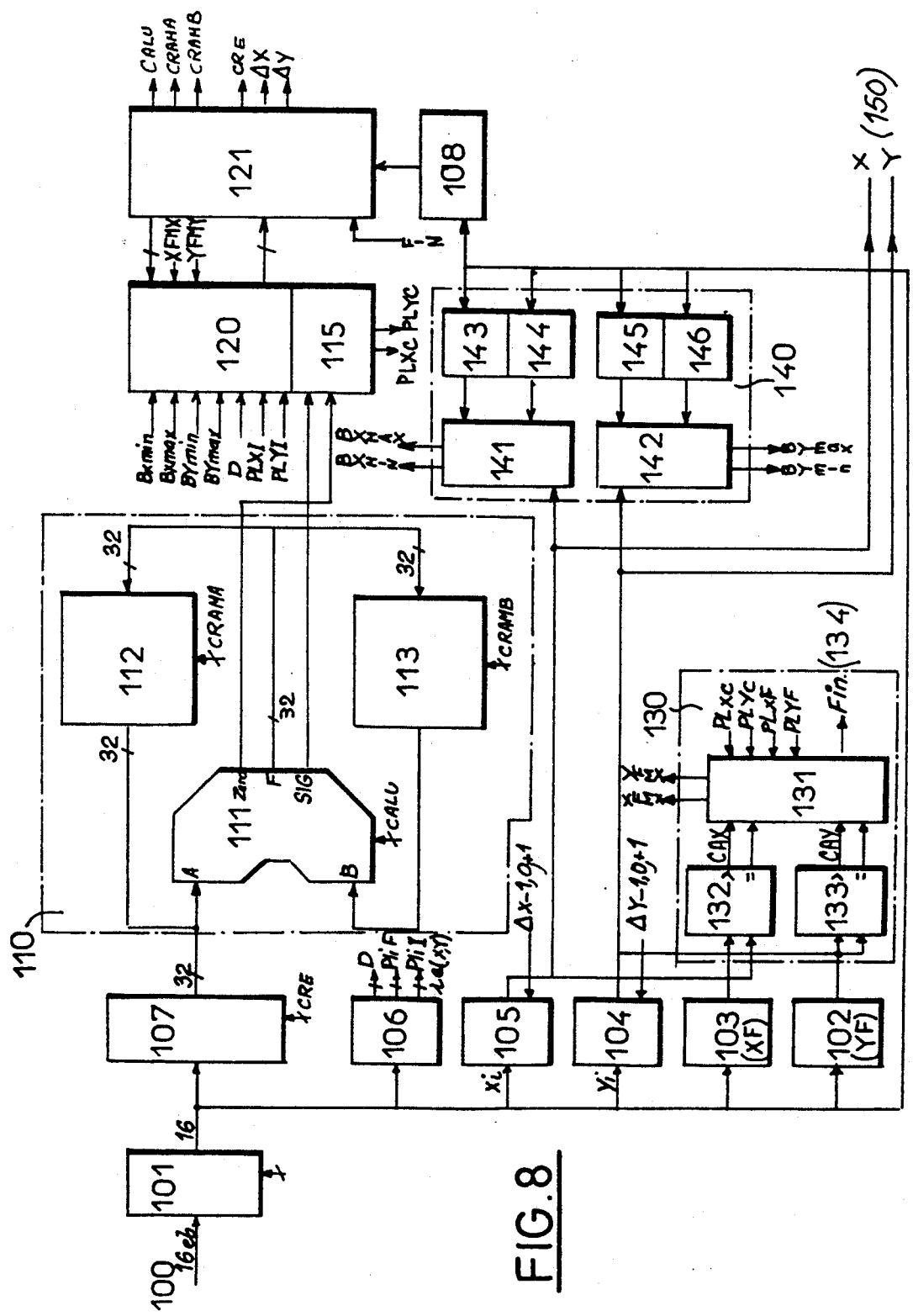
FIG. 8 is a block diagram representing the architecture of a wired logic system for implementation of the process for plotting according to the invention.

Any equivalent means permitting the verification of the stopping criterion is suitable, as for example the direct comparison of the coordinates of the current point and the final point (see FIG. 8).

The refinement of the process according to the invention likewise makes it necessary to be able to resolve the case in which the point of departure and the final point are merged, which arises for a zero arc of a curve or for a closed curve (before or after geometric transformation, in the case for example in which the ellipses are obtained by application of a geometric transformation to a circle). There is therefore reason to discriminate, before a geometric transformation, whether the arc which one has to plot is a small arc or a large arc, in such a way as to eliminate zero arcs.

The heart of the present invention consists of the process for processing the parts of the curve which extend beyond the display window.

The object of this process is to generate in an incremental manner the points which will be plotted on the border of the window that is overstepped by the parts in overextension, in such a way as to rejoin the final point by following the projection of the curve on the border. If the curve returns into the window, the algorithm must then make it possible to resume following the curve with the assistance of the plotting process just described. The process for processing overextending parts likewise makes it possible to manage the initialization and the stopping of the process for a curve or portion of a curve containing an initial and/or final point in overextension.

Figure 5C:
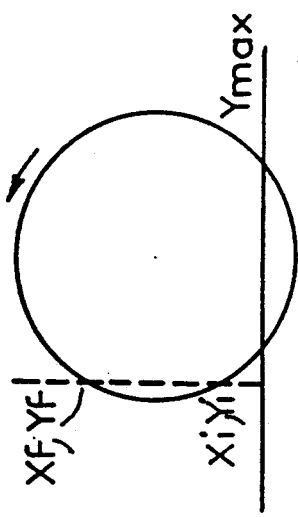
FIGS. 5a, 5b, 5c illustrate the different cases dealt with in the process for crushing of overextending parts of curves on the window borders.
Figure 5B:
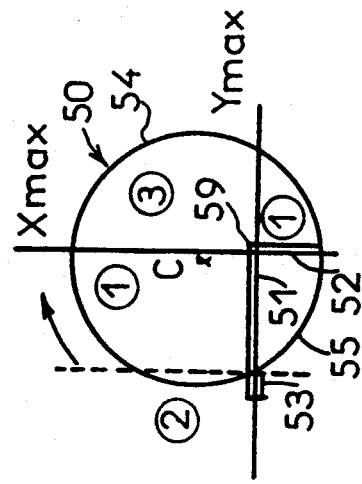
Figure 5A:
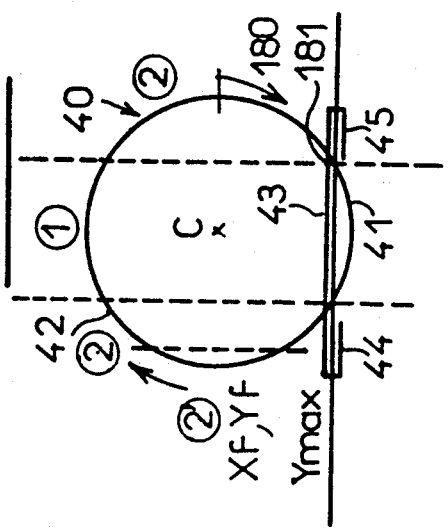

FIGS. 5A, 5B, 5C illustrate, in the case of plotting a circle, the different cases of overextension.

In FIG. 5A, the circle 30 is essentially situated inside the display window, that is to say on this side of the border line of the window Y$_{max}$. The principal arc of the circle 30 is thus plotted inside the window in accordance with the process for plotting described above.

On the other hand, when the plotting device implementing the process according to the invention detects the overstepping of the boundaries of the window, the process for processing the overextending parts is activated. This processing process ensures the crushing of the overextending part 31 along the window border, in such a way as to form the segment of a straight line 32 (represented by dotted lines) which closes the outline. The arc 31 is not plotted.

In the case in FIG. 5B, the main part of the circle 40 is located outside the window. When, after having plotted the portion 41 of the circle 40 located inside the window, the plotting device detects the overstepping of the window border, the crushing of the overextending part 42 then consists, in a non-optimized version, in plotting not only the junction segment 43 ensuring the closure of the outline in cooperation with the arc of the circle 41, but also two doubled segments 44, 45, situated on either side of the closure segment 43. The doubling of the segments 44, 45 is explained by the fact that in the corresponding zone (zone 2), for a given abscissa X two points of the arc correspond on the overextending part.

Finally, FIG. 5C presents the configuration in which the circle 60, whose main part is situated outside the window, overextends at the level of the window corner 59.

Unlike already existing processes, the process according to the invention makes it possible to avoid plotting the doubled portions 44, 45, 53, and to suppress the useless calculation for successive projection of all the points of the arc 54 on the same window corner 59. The executed projection is thus limited in an optimum manner to the closure segments 51, 52.

In fact, in the process in accordance with the invention, one can no longer speak of projection of the overextending parts of the circle, but indeed rather of simple plottings of a junction (32, 43, 51+59+52) limited to what is strictly necessary, and executed independently of the configuration of the overextending part of the curve.

The logic of the process according to the invention corresponds to the succession of the three following steps:

Analysis of the situation at the time of overstepping of a window boundary, in order to determine the direction of travel along the border by the crushed plotting (as a function of the current quadrant, and of the position of the final point).

"Blind" continuation of the incrementations along the window border, until

Verification of the conditions for resumption of the normal algorithm, or verification of the stopping criterion.

In this regard, the existence of a stop in overextension necessitates advance processing in such a way as to homogenize the test for the stopping criterion in overextension with the stopping criterion test detailed above in the context of the process for plotting of curve parts inscribed inside the display window.

The detection and analysis of the overstepping of the window border by the curve are executed just as well when the curve exits from, as when it returns inside, the window.

Exiting from the window is detected when one of the coordinates X or Y of the curve leaves the interval ($x_{min}$-$x_{max}$); ($y_{min}$-$y_{max}$), respectively (Table IV$_{1.1}$).

Then the process consists in determining from what side the concavity of the curve is turned at the current point, with regard to the window in the case of a circle or ellipse, that is to say, to predict whether the projection of the overextending part will form a doubled segment 44, 45, 53 or not. An example of the simulation of this test can be found in Table IV$_{1,2}$, the current quadrant being identified by the value of the couple of the signs of the partial derivatives of the function at the current point.

In the case in which the test for determination of the concavity permits one to conclude that the overextending part of the circle belongs only to one zone 1, that is to say it corresponds to an overextending arc of a circle whose concavity is turned toward the window, then the "crushed" segment is executed by applying uniquely the increment dx or dy parallel to the window border, which takes the value +1 or −1 as a function of the derivative associated with the coordinate in overextension (see Tables V$_{8,9,10,11}$).

In the case in which the identification of the concavity indicates that the projection of the overextending arc of a circle forms a doubled segment 44, 45, 53, the process provides for a "retrogression" of the incrementation, in order to avoid the useless plotting. More precisely, in contrast to the previous case, the increment parallel to the window border will find itself assigned the inverse value (−1 or +1).

The plotting device will then directly plot the segment 43 subsequent to the internal arc of a circle 41 (FIG. 5B), or else the segment 51 subsequent to the internal arc 55 (FIG. 5C), without a useless excursion at 44 and 53 respectively.

In the case in which the center of the circle is located on the window border, there is an ambiguity, which is resolved in a known manner by applying a correction term. Furthermore, the retrogression is likewise subject to the condition that the final point of the portion of the curve to be plotted is not located in zone 2 of the overextending part (FIG. 5B). This case will be dealt with further below.

In the process in accordance with the invention, the criteria for return to the normal plotting process, besides the detection of the final point, are as follows:

The increment dx, dy corresponding to the coordinate in overextension (x or y, respectively) must return the plotting toward the window;

The current increment over the coordinate that is not in overextension must correspond to the increment at the point of intersection of the curve with the limit of the window. This condition is explained in more detail below.

The use of these two conditions for resumption of the normal plotting process corresponds to a still greater simplification of processing. In fact, resumption of the normal process thus requires the following of only two parameters, and this of course without knowing the theoretical coordinates of the current point of the overextending circle, since the process for plotting in overextension operates "blind." These two conditions make it possible to take into account both the configuration in FIG. 5A (circle with slight overextension) and that in FIG. 5B (circle with predominant overextension).

Figure 11:
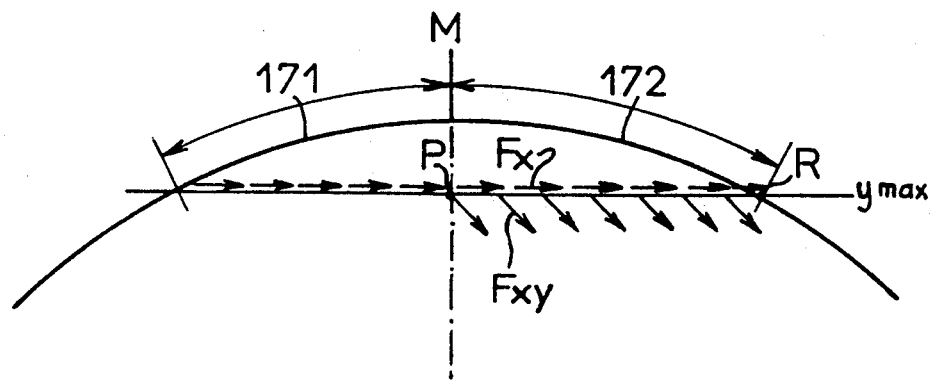
FIG. 11 illustrates the embodiment of the invention in accordance with which the resumption of the normal plotting process intervenes before the actual return of the overextending plotting inside the window.

The first condition (increment over the coordinate in overextension, steering toward the window) has as its effect to order resumption of the normal plotting process after the passing of the extremum in overextension,[1] in the case of a slight overextension. This results from the fact that in the case in which the concavity of the overextending part of the curve is turned toward the window, as shown in FIG. 11, the application of the combined Jordan+Bresenham algorithm to the returning overextending branch 172 automatically ensures the continuation of the crushed plotting from the extremum M to the point R of actual return into the window. More precisely, the calculated Jordan functions for this branch 172 are Fx and Fxy, the function Fy being ignored for the current quadrant. Now, the application of these two functions at a point P crushed onto the window leads to a systematic choice of the function Fx, which minimizes the distance between the new plotted point and the theoretical curve while the overextending curve remains outside the window. In this way, the closure of the outline, by crushing the overextending curve onto the window border, is carried on continuously, independently of the substitution of the normal plotting process for the process for plotting in overextension.

[1][Translator's Note: Reading the nonexistent word "dépacement" as a typographical error for "dépassement." The reading "déplacement" would result in the less meaningful translation " . . . after the displacement of the extremum in overextension . . . "]

Of course, when the plotting returns inside the window, in the vicinity of the point R, both of the functions Fx and Fxy will alternatively be chosen to generate the plotting of the current quadrant. It will furthermore be noted that depending on the resolution of the plotting device and depending on the slope of return into the window of the overextending branch 172, the crushed plotting may be interrupted either slightly before or slightly after the overstepping of the point R.

The second condition for return (the current half-circle must intersect the window border) makes it possible to take into account the configuration of a predominant overextension (FIG. 5b). It will in fact be noted that this condition is systematically fulfilled in the case of a minority overextension (FIG. 5A and FIG. 11).

In the case of overextending curves with a concavity turned toward the outside (FIG. 5b) the resumption of the normal plotting process must not take place at the time of overstepping of the extremum in overextension. On the contrary, the process for plotting in overextension must be maintained, in such a way as to be able to achieve the plotting of the double portions 44, 45 and in such a way as to symmetrize the retrogression conditions upon entry into and upon exit from the overextension. Consequently, the resumption of the normal process must not take place until the theoretical current point belongs to the lower half 180 of the return branch (in fact, because of the elimination of the double plotting 45, this condition is satisfied immediately after the retrogression at 181).

In one advantageous manner of embodiment of the invention, the discrimination between the upper half (not referenced) and the lower half 180 of the return branch is performed using a PLX flag (overextension with respect to X) or PLY (overextension with respect to Y). These flags PLX, PLY take only 0 or 1 as their value. In a conventional manner, the value 0 indicates that the current theoretical point is situated in the half-circle intersecting the window border. The value 1 corresponds to the upper half-circle. In other words, for a concavity portion of an overextending part of the curve (as at zones 2 of FIG. 5b) which open away from the boundary Ymax there are extremums such that a projection of a point from one side of the extremum onto Ymax is duplicated by the projection thereon from a point on the other side of the extremum, resulting in doubled plots as at 44 and 45 of the Figure. Opposite sides of an extremum of such a concavity may be differentiated by providing concavity flags PLX and PLY and assigning different values (0 and 1) to the flags according to which side of the extremum that corresponding coordinates X and Y of a particular point of said overextending part would lie on. By convention, the value 0 indicates that a point on the concavity lies on that side of the extremum which intersects the boundary of the display window and a value of 1 corresponds to a point lying on the other side of the extremum of the concavity.

Of course the flag PLX, PLY never assumes the value 1 in the case of circles with minority overextension (FIG. 5A, FIG. 11).

This mechanism corresponds to the case of the plotting of overextending arcs of circles or ellipses.

The process for plotting portions of curves inscribed inside the window then resumes as already described.

The flags PLX, PLY likewise make it possible to handle in an optimum manner the projection of the zone 3 of FIG. 5C (overextension at window corner). In fact, when the comparators of the process (Table $IV_{1,1}$) detect an overextension at a window corner, there is simply an updating of the flags PLX, PLY in accordance with an order that depends on the concavity with regard to the two overstepped borders ($x_{max}$, $y_{max}$) and the direction of travel. The conditions in order for the flags PLX, PLY to be inverted are that the concavity at the current point must be turned toward the outside of the window, and that the increment in the other direction should cause an exit from the window (Tables $VI_{12}$, $VI_{13}$).

Along with the detection of overstepping of the window, and the management of the increments for excursion of the plotting on the window, the processing process according to the invention likewise comprises a processing of the stopping criterion in overextension.

In fact it is necessary to verify the stopping criterion on the window border when the final point is situated outside the screen.

The counters CAX CAY or their equivalent comparators, which serve to monitor this criterion, will therefore be initialized taking into account not the theoretical final point situated outside the screen, but its projection onto the window border. (Table $IIIB_{4,7}$). However, this projection is insufficient to discriminate between the two points of the same projection of a zone 2 in overextension. Consequently the preliminary projection of the final point onto the window border is accompanied by the identifying of the value of the flags PLX, PLY at the theoretical final point (Table $IIIB_6$).

Figure 6C:
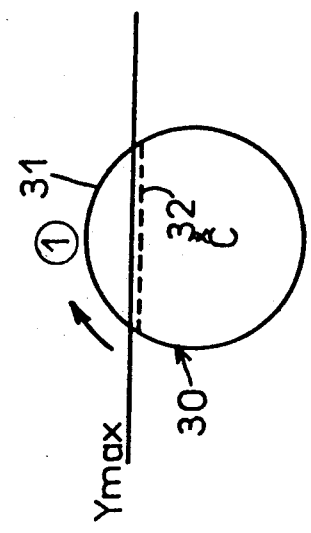
FIGS. 6a, 6b, 6c, 6d illustrate the taking into account of stopping criteria at the initial point and at the final point in the event of the crushing of an overextending curve.
Figure 6B:
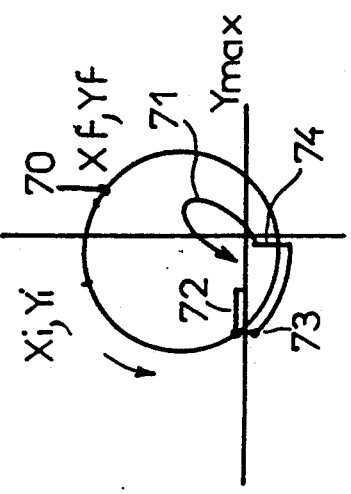
Figure 6A:
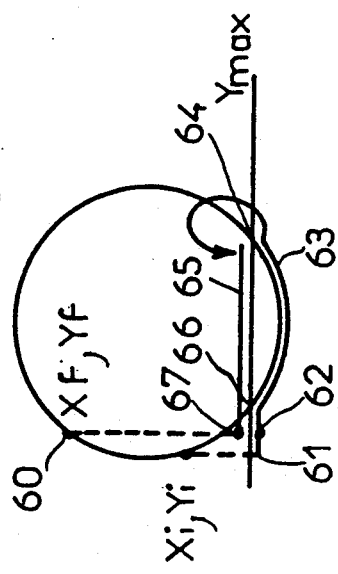

FIGS. 6a, 6b illustrate two configurations in which the final point 60, 70 with coordinates ($x_f, y_f$) is in overextension, respectively in zones 2 and zones 3.

In the case of FIG. 6a, the plotting starts at 61 (initial point $x_i, y_i$ in overextension). At 62, the plotted point verifies the coordinates of the projection of the final point 60, but the flag PLX has the value 0, and does not coincide with the value of the flag PLXF of the final point. The process therefore orders the continuation of the plotting, with plotting of the inscribed arc of a circle 63, retrogression at 64, plotting of the crushed segment 65, and continuation of the plotting in the crushed state, beyond the point of return 66 of the curve into the window, until the projection 67 of the final point 60 is reached. At point 67, the flag PLX of the current point coincides with the previously calculated flag PLXF of the final point. It will be noted that at 66 the condition for retrogression has not been verified, owing to the fact that the final point 60 is located in the zone 2 situated beyond the points 66.

The reasoning to be followed is identical for FIG. 6b, with the difference that the final point 70 is located projected onto the upper window corner 71. The plotting actually executed is thus limited to the crushed segment 72, the inscribed arc of a curve 73, the second crushed segment 74, and the window corner point 71.

In the case in FIG. 6C, it is likewise the flag PLX that serves to distinguish the projection of the initial point ($x_i, y_i$) and final point ($x_f, y_f$).

Figure 6D:
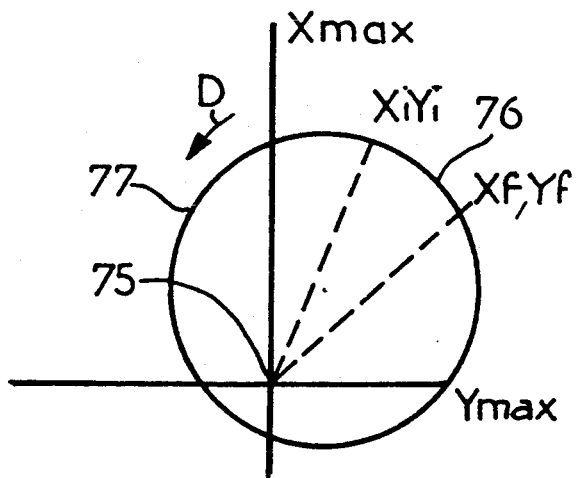

In the case in FIG. 6D, where the initial and final points are both in zone 3 and therefore projected onto the same point 75 of the window corner, one can conceive that it is necessary to discriminate between the case where the arc of a circle to be plotted is the small arc of a circle 76 entirely outside the window, and the case where the large complementary arc of a circle 77 is involved. In this case, it is the information on the direction D of the plotting that makes it possible to distinguish between the two cases.

The description of the characteristics of the process for plotting under the invention, as it has just been described, specifically relates to the case in which the curve to be plotted is a circle or an arc of a circle. Of course, the object of the invention is not limited to this configuration, and extends notably to all curves or portions of curves of the second degree, whose function is expressed in the form $$F(x,y)=ax^2+by^2+cxy+dx+ey+f=0.$$

Thus the process described for the circle may notably be perfectly generalized to the case of ellipses.

Figure 7:
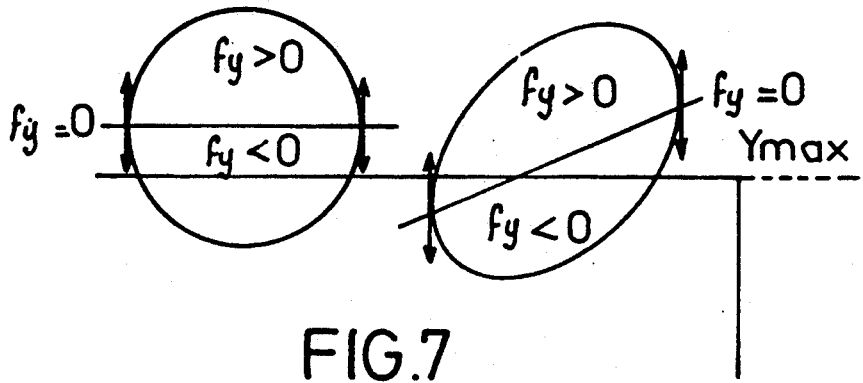
FIG. 7 illustrates the extension of the process for crushing, under the invention, to the processing of overextending ellipses.

However, ellipses require an adaptation of the processing in overextension presented for the circle, owing to the fact that with constant coordinates, the partial derivative does not vary in the case of the circle, while it changes in the general case of the ellipse (see FIG. 7):

$$f_x=2ax+cy$$

$$f_y=2by+cx.$$

This variation in the partial derivative is reflected as a change of the properties of the ellipse at its points of intersection with the boundaries of the window. This variation is well taken into account in the calculation of the partial derivatives, but it must also be taken into account in the management of the flags PLX and PLY. These latter indicate permanently whether the respective signs of the partial derivatives of the function at the calculated point and at the theoretical point of the ellipse are identical or opposite. The process for processing overextending parts must therefore include a supplementary condition of change of state of the flags PLX and PLY, namely the change of the sign of the partial derivatives $f_x$ and $f_y$ at the time of the displacement on the window border.

Furthermore, one must be careful to use a display resolution or plotting resolution that is sufficient with regard to the scale of the ellipse. In fact when this resolution is too coarse, there are risks of looping of the processing process, particularly in the narrow ends of the ellipse.

Tables I to VI attached to the present application present a simulation software for the process under the invention, written in the PASCAL language. However, the process according to the invention is intended to be preferentially implemented in the form of a wired logic, as represented in FIG. 8.

The simulation software is presented in the following manner:

TABLE I: Definition of the employed variables;

TABLE IIA: Procedure for calculation of the sign of the partial derivatives;

TABLE IIB: "Exclusive or" procedure;

TABLE IIIA: Input of data and initialization of parameters useful for plotting, for a circle;

TABLE IIIB: Taking into account of final conditions;

TABLE IIIC: Initialization of parameters useful for plotting, for a straight line;

TABLE IV: Plotting of the antiderivative: positioning of the logical variables defining the state of the point calculation automaton; and the calculation of the state of the automaton;

TABLE $V_0$ to $V_{16}$: Processing relating to the different states of the automaton;

TABLE VI: Verification of the end criterion.

Each of the tables is provided with detailed commentaries explaining each phase of the process, in such a way that any specialist may understand immediately the meaning of each program step.

The simulation is organized around a main program starting in Table IV, a program for data input and preliminary processing (Tables IIIA, IIIB, IIIC), as well as two procedures, each defining respectively the process for calculation of the sign of the partial derivatives (Table IIA), and the "EXCLUSIVE OR" logical expression (Table IIB). These two procedures were isolated from the main program, owing to the fact that they are frequently called upon in the course of the implementation of the simulation of the process for plotting according to the invention.

This simulation software was limited to the application of the process for plotting to two types of curves: Segments of a straight line, and circles and arcs of circles and arcs of an ellipse. In the case of the circle $a=b=1, c=0$.

Consequently the data input tables (Tables III) include on the one hand the initialization process for the circle (Table IIIA) and for the straight line (Table IIIC). The initialization for the circle consists in determining the quadrant of the point of departure, by calculation of the partial derivatives (IIIA$_{2,3}$), and if applicable in projecting the point of departure on the window border, when the point is in overextension. In the latter case, the corresponding calculations for the quadrant and for initialization of the flags PLX, PLY are likewise ensured (IIIA$_{4,8}$).

In the case of the straight line, the simulation program calculates the value of the partial derivatives (IIIC$_1$), projects, if necessary, the initial point in overextension (IIIC$_2$), then calculates the value of the counters CAX, CAY with regard to the coordinates of the final point $(X_f, Y_f)$ (IIIC$_3$).

The taking into account of the final conditions, in the case of a circle, has already been commented upon. The goal of this part of the process is to initialize the plotting in such a way as to cause the plotted final point to coincide with the theoretical final point (IIIB$_2$), then, if necessary, to project the final point that is in overextension, with determination of the four recognition parameters $(x_f, y_f, PLX, PLY)$. (IIIB$_{4,6}$).

The heart of the simulation software consists of a loop ("REPEAT" ... "UNTIL") which is successively run through for each point of the curve to be plotted. The set of parameters of the curve or portion of a curve has been defined in advance by reading the contents of the display list (IIIA$_1$). The display list is read only once; it is not modified by the implementation of the process under the invention.

The actual plotting of the curve is intended to be used by an automaton (FIG. 8) which supplies the value of the increments that make it possible to plot each new point of the curve from the preceding point, until the final point is reached, as a function of the logical variables for positioning.

These logical variables respectively ensure the detection of a possible overextension for the current point (IV$_{1.1}$), the determination of the current quadrant (IV$_{1.2}$), and the taking into account of the value of the flags PLX and PLY, as well as the direction of plotting (IV$_{1.3}$).

The other variables, calculated in Table IV, which serve for the determination of the state of the automaton, correspond to an updating of the parameters after verification of the retrogression condition.

As explained previously, the existence or non-existence of a retrogression is a function of four parameters: the direction of plotting of the curve, the quadrant of the current point, the sign of the function, the current value of the flags PLX PLY, and the possible existence of a final point in zone 2 or 3. Each of the cases corresponding to the different possible combinations for these four parameters is dealt with in a logical expression (LSAUX, LSAUY) IV$_{2.1}$.

The state of the automaton is then determined by taking into account the total set of useful variables, with switching, for each state of the automaton, to a different subprogram, by means of an addressing table (IV$_3$).

The processing specific to each state of the automaton then appears in Tables $V_0$ to $V_{16}$, in such a way as to supply the new values of the coordinates (x,y) of the new point to be plotted, or the new values of the variables PLX and/or PLY.

Figure 12:
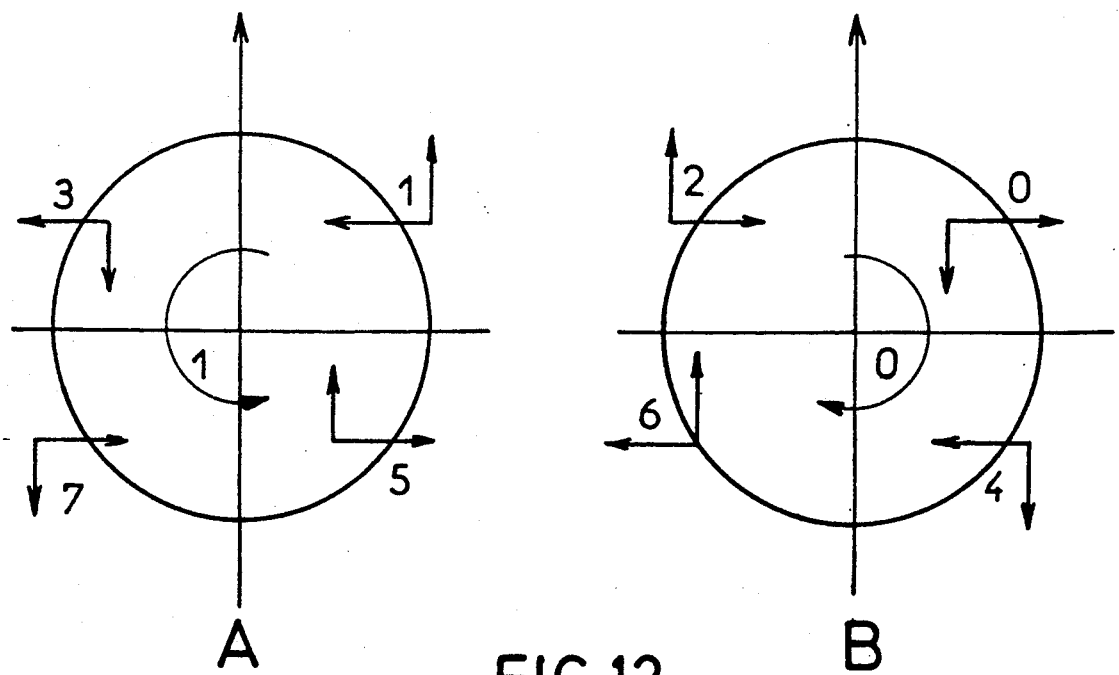
FIGS. 12A and 12B illustrate the eight cases of branching of the normal plotting process simulated by software (TABRA (INDIC) table).

The first eight cases (Tables $V_0$ to $V_7$) correspond to the different cases determined by the sign of the partial derivatives of the function, the direction of travel, that is to say, the different cases of the Jordan algorithm. These eight situations are illustrated in FIG. 12, and in the logical table below.

TABLE A

VALUES OF THE INPUT AND OUTPUT VARIABLES FOR CASES 0 TO 7 IN THE TABRA (INDIC) BRANCHING TABLE (FIGS. 12A and 12B).

| INPUT VARIABLES | | | OUTPUT VARIABLES | | | |
|---|---|---|---|---|---|---|
| SDFX | SDFY | SENS[a] | incx | incy | entx | CASE |
| 0 | 0 | 0 | 0 | 1 | 0 | 0 |
| 0 | 0 | 1 | 1 | 0 | 1 | 1 |
| 0 | 1 | 0 | 0 | 0 | 1 | 2 |
| 0 | 1 | 1 | 1 | 1 | 0 | 3 |
| 1 | 0 | 0 | 1 | 1 | 1 | 4 |
| 1 | 0 | 1 | 0 | 0 | 0 | 5 |
| 1 | 1 | 0 | 1 | 0 | 0 | 6 |
| 1 | 1 | 1 | 0 | 1 | 1 | 7 |

Key:
[a][direction]

The input variables SDFY, SDFX and SENS [=DIRECTION] correspond respectively to the signs of the derivative with respect to y and with respect to x, and to the direction of travel along the circles in FIGS. 12A, 12B.

The output variables incx, incy represent the value of the increments in x and in y as a function of the current quadrant (determined by the couple SDFY, SDFX), and of the direction of travel. By convention, incx and incy assume the value 0 for a positive increment, and the value 1 for a negative increment. The output variable entx indicates that it[1] is the entering function (Fx or Fy) which will be selected in accordance with Bresenham. By convention, the value 0 indicates that the entering function is Fy, and the value 1, Fx.

[1][Translator's Note: Reading "qu'elle" literally. In fact this is very likely a typographical error for "quelle," in which case the translation is: "... indicates which entering function (Fx or Fy) it is that will be selected in accordance with Bresenham."]

These eight cases detailed in Table A and FIG. 12A, 12B correspond to the implementation of the normal process for plotting inside the window.

Figure 13:
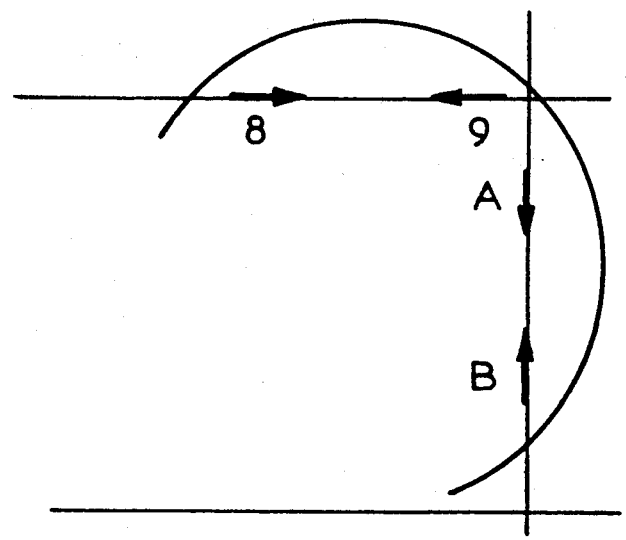
FIGS. 13, 14A and 14B illustrate the six cases of crushing of overextending plottings in accordance with the process for plotting in overextension under the invention.

FIG. 13 illustrates the cases 8, 9, A and B (Tables $V_{8,9,10,11}$) of the TABRA (INDIC) branching table. In this instance operation in the "blind" mode is involved, since cases 8 and 9 correspond respectively to an increment and to a decrement in x on the window border, and cases A and B correspond to a decrement and to an increment in y.

Figure 14:
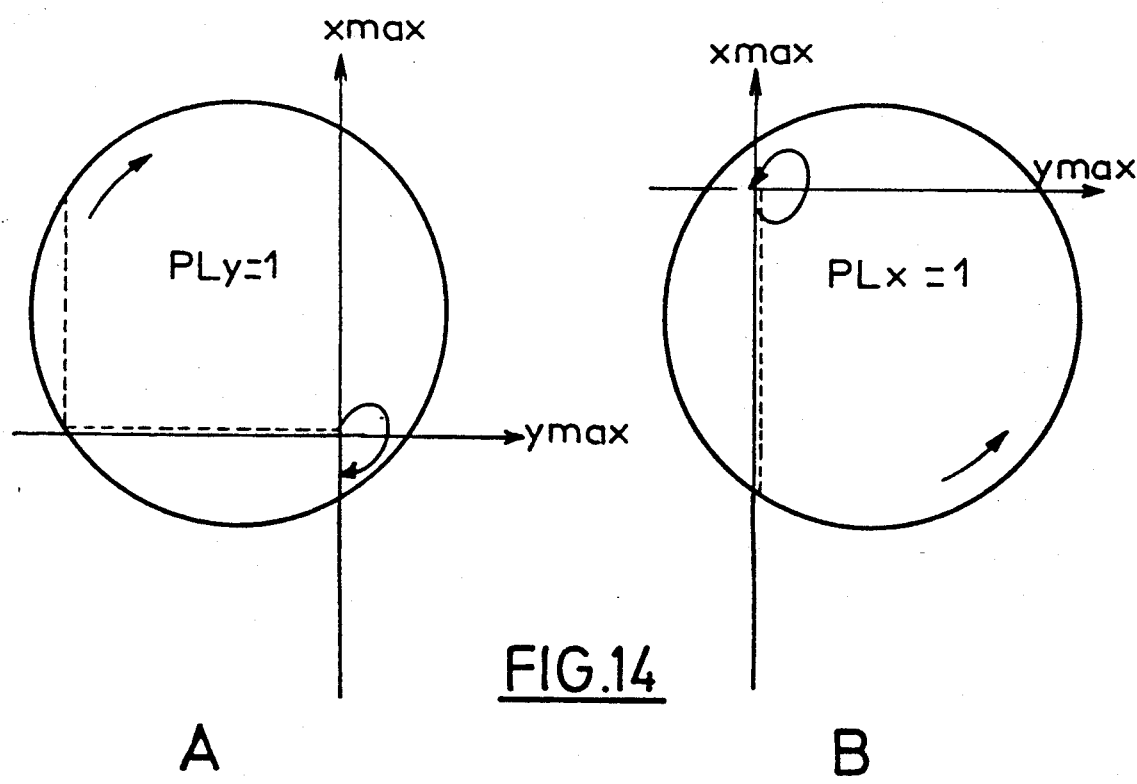

Cases C and D are illustrated respectively in FIG. 14A and 14B, and correspond to the overstepping of a window corner, with updating of the variables PLY, PLX, respectively (see Tables $V_{12,13}$).

In addition to cases E and F (Table $V_{14,15}$) for tests, case G corresponds to the situation of retrogression of the plotting, that is to say, of jumps making it possible to avoid plotting a doubled crushed portion.

The full contents of the TABRA (INDIC) table appear in Table B.

TABLE B

(JUMP = 0)

| PLX = 0 | | | | | | | | | | PLY = 0 | | | | |
|---|---|---|---|---|---|---|---|---|---|---|---|---|---|---|
| 0 | 1 | 2 | 3 | 4 | 5 | 6 | 7 | 0 | 9 | 8 | 3 | 4 | 8 | 9 | 7 |
| 8 | 1 | 2 | 9 | 9 | 5 | 6 | 8 | F | F | F | F | F | F | F | F |
| A | 1 | B | 3 | 4 | B | 6 | A | A | 9 | C | 3 | 4 | D | 9 | A |
| D | 1 | B | 9 | 9 | B | 6 | C | F | F | F | F | F | F | F | F |
| 0 | B | 2 | A | A | 5 | B | 7 | 0 | C | 8 | A | A | 8 | D | 7 |
| 8 | B | 2 | D | C | 5 | B | 8 | F | F | F | F | F | F | F | F |
| F | F | F | F | F | F | F | F | F | F | F | F | F | F | F | F |
| F | F | F | F | F | F | F | F | F | F | F | F | F | F | F | F |

| PLX = 0 | | | | | | | | | | PLY = 1 | | | | |
|---|---|---|---|---|---|---|---|---|---|---|---|---|---|---|
| F | F | F | F | F | F | F | F | F | F | F | F | 8 | 9 | 8 | 9 |
| 9 | 8 | 9 | 8 | F | F | F | F | F | F | F | F | F | F | F | F |
| F | F | F | F | F | F | F | F | F | F | F | F | D | 9 | C | 9 |
| 9 | D | 9 | C | F | F | F | F | F | F | F | F | F | F | F | F |
| F | F | F | F | F | F | F | F | F | F | F | F | 8 | C | 8 | D |
| C | 8 | D | 8 | F | F | F | F | F | F | F | F | F | F | F | F |
| F | F | F | F | F | F | F | F | F | F | F | F | F | F | F | F |
| F | F | F | F | F | F | F | F | F | F | F | F | F | F | F | F |

| PLX = 1 | | | | | | | | | | PLY = 0 | | | | |
|---|---|---|---|---|---|---|---|---|---|---|---|---|---|---|
| F | F | F | F | F | F | F | F | F | F | F | F | F | F | F | F |
| F | F | F | F | F | F | F | F | F | F | F | F | F | F | F | F |
| F | F | A | B | F | F | A | B | F | F | A | C | F | F | A | D |
| F | F | D | B | F | F | C | B | F | F | F | F | F | F | F | F |
| B | A | F | F | B | A | F | F | C | A | F | F | D | A | F | F |
| B | D | F | F | B | C | F | F | F | F | F | F | F | F | F | F |
| F | F | F | F | F | F | F | F | F | F | F | F | F | F | F | F |
| F | F | F | F | F | F | F | F | F | F | F | F | F | F | F | F |

| PLX = 1 | | | | | | | | | | PLY = 1 | | | | |
|---|---|---|---|---|---|---|---|---|---|---|---|---|---|---|
| F | F | F | F | F | F | F | F | F | F | F | F | F | F | F | F |
| F | F | F | F | F | F | F | F | F | F | F | F | F | F | F | F |
| F | F | F | F | F | F | F | F | F | F | F | F | F | F | D | C |
| F | F | C | D | F | F | F | F | F | F | F | F | F | F | F | F |
| F | F | F | F | F | F | F | F | F | F | F | F | C | D | F | F |
| D | C | F | F | F | F | F | F | F | F | F | F | F | F | F | F |
| F | F | F | F | F | F | F | F | F | F | F | F | F | F | F | F |
| F | F | F | F | F | F | F | F | F | F | F | F | F | F | F | F |

(JUMP = 1)

| PLX = 0 | | | | | | | | | | PLY = 0 | | | | |
|---|---|---|---|---|---|---|---|---|---|---|---|---|---|---|
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |

| PLX = 0 | | | | | | | | | | PLY = 1 | | | | |
|---|---|---|---|---|---|---|---|---|---|---|---|---|---|---|
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |

| PLX = 1 | | | | | | | | | | PLY = 0 | | | | |
|---|---|---|---|---|---|---|---|---|---|---|---|---|---|---|
| G | G | G | G | G | G | G | G | G | G | G | G | G | G | G | G |
| G | G | G | G | G | G | G | G | G | G | G | G | G | G | G | G |

TABLE B-continued

| G | G | G | G | G | G | G | G | G | G | G | G | G | G | G | G |
|---|---|---|---|---|---|---|---|---|---|---|---|---|---|---|---|
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | PLX | = | 1 | G | G | G | G | G | G | PLY | = | 1 | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |
| G | G | G | G | G | G | G | G | G | G | G | G | G | G | G | G |

Of course, the TABRA (INDIC) table may just as well be replaced by a set of equations, or by any other branching process.

In another version of the simulation software, it would be conceivable likewise to deal with the criterion for end of plotting in an expanded table.

As one thus finds, the logic of the plotting routine is perfectly independent of the window parameters, which intervene only as variables, which notably makes it possible to avoid a modification of the display list. The process likewise reduces in a substantial manner the durations and complexity of processing, compared to the process of preliminary calculation of the points of intersection of the curve with the window, owing to the fact of the simultaneity of processing for cutting-off with the process for plotting.

FIG. 8 represents the block diagram of a preferred manner of embodiment of a wired logic circuit implementing the process according to the invention.

The circuit admits at its input the plotting command words, namely the contents of the display list:
Nature of the curve;
Attributes of the curve (color, background, direction of travel, ... );
Coordinates of the characteristic points.

In the shown mode of embodiment, it is assumed that the initialization calculations have already been executed. This means that in the case of the circle, for example, the actual point of departure ($x_i$, $y_i$) has been calculated and if applicable projected; the sign of the partial derivatives at the start is known; the value of the function has been calculated; and the final point has been identified, and if applicable projected. Of course, these initialization operations may just as well be carried out in the automaton in FIG. 8.

Upon exiting from the buffer 101, situated after an initialization module, the command words and the values are selectively sent to registers for storage of the coordinates of the final point 102, 103, of the coordinates of the calculated initial point 104, 105 (stored in memory in an incrementing-decrementing register), and of the state of the flags PLX, PLY at the initial and final points, as well as the information of the direction of plotting D (106), and the nature of the curve (108). The data for initialization of the value of the function at the initial point (FA), as well as the value of the partial derivatives DFX, DFY, and the value of the parameters of the equation of the curve to be plotted, are introduced into the transformer 107, ensuring an extension to 32 bits in such a way as to permit processing by the Logical Arithmetic Unit 111 of the calculation module 110.

The module 110 includes in addition two RAM memories 112, 113 which play the role of registers for storage of the values from the calculation of the preceding iteration and of the parameters of the equation. These memories are used to calculate the values of the functions and derivatives for each new point to be plotted.

In fact, the following equations are preferentially used for each iteration, with a=1, b=1, c=0 in the case of a circle.

Partial Derivatives:

$$fx(i+1)=fx(i)+2*a*dx+c*dy \quad \text{(DFX)}$$

$$fy(i+1)=fy(i)+2*b*dy+c*dx \quad \text{(DFY)}$$

with dx and dy= +1,0,−1
Antiderivative:

$$Fx(i+1)=Fa+fx(i)*dx+a*dx^2$$

$$Fy(i+1)=Fa+fy(i)*dy+b*dy^2$$

$$Fxy(i+1)=Fa+fx(i)*dx+fy(i)*dy+a*dx^2+b*dy^2+c*dx*dy$$

with
i = current iteration;
Fa = value of the function at the iteration point i;
a,b,c = constants of the algebraic equation of the second-degree curve;
dx,dy = plotting increments.

It is these iterative equations that are used in the simulation software (see for example Table $V_0$, the calculation of the values $F_2$ and $F_1$ or $F_3$ of the function, and the partial derivatives DFX, DFY).

These values calculated by the module 111 for the current point are then stored in the memories 112, 113, to serve as calculation parameters in the subsequent iteration. The sequencing of the unit 111 and of the memories 112, 113 is accomplished by means of the command orders CALU, CRAMA, CRAMB coming from the automat's sequencing logic module 121.

The sign of the values calculated by the module 111 as well as the result of their comparison with the real value are sent to the module 115; from these it will deduce in the course of calculation:
the extended sign of the variables SDFX, SDFY
the increments dx and dy
the direction of incrementation (ENTX) and the choice of the point to be written that gives the smallest value of the function
the values of the variables PLX and PLY.

The circuits 132 and 133 are fed respectively by the x incrementing-decrementing register 105 and the register 103 for storage of the abscissa xf of the final point for the circuit 132, and by the equivalent Y registers 104 and 102 for the circuit 133.

They respectively supply the position of the current point with regard to the final point (TAB $IV_{1.4}$) as well as the values (x=xf), (y=yf) that indicate their coincidence. The logical circuit 131 supplies, from the signals x=xf and y=yf as well as from the flags PLX, PLXF, PLY, PLYF, information on the end of plotting 134.

The module 140 detects the overextension of the curve, by means of comparator circuits 141, 142 working on the one hand on the parameters of the display window stored in the registers 143, 144, 145, 146 and on the other hand on the value of the coordinates of the current point coming from the registers 105, 104 (Table $IV_{1.1}$).

The set of logical variables supplied by the module 130 for the stopping criteria, the module 140 for detection of overextension, and the register 106, is supplied to the logical module 120 for determination of the change of state of the automaton. This logical module performs the determination of the state of the automaton (Table $IV_3$ of the simulation software) as a function of the logical variables BXMIN, BXMAX, BYMIN, BYMAX, D, XFMX, YFMY, and the current values of the flags PLX, PLY determined iteratively from their value at the initial point PLXI, PLYI as well as from the values issued by the circuit 115 SDFX, SDFY, SFA (Table $IV_{2.3}$). The module then supplies the information on the state of the automaton (case O to case G) to the sequencing module 121. This latter then deduces from this the values of the increments dx, dy to be supplied to the incrementing-decrementing registers 105, 104.

The module 121 likewise ensures, as already mentioned, the sequencing of the circuits 111, 112, 113 and of the transformer circuit 107, and more generally of the whole.

The increments dx, dy supplied to the register 104, 105 make it possible to obtain the coordinates (x, y) of the new plotted point (150), which are supplied to the plotting module of the device for graphics and videographic plotting, or an analogous device. These same values are reintroduced into the modules 130, 140 for the calculations of the new iteration.

The increments dx/dy may likewise be output at 150.

The implementation of the process according to the invention in the circuit represented in FIG. 8 makes it possible to optimize substantially calculation times, and to simplify to the maximum the architecture of the equipment.

Except for the initialization phase, the execution of an iteration via this circuit necessitates a mean calculation time of 10 microseconds to 20 microseconds, starting from the simulation software. The final equipment embodiment based on the circuits in FIG. 8 makes it possible to achieve calculation times on the order of 300 to 500 ns. This time may be further improved if the functions are integrated into a single circuit.

The window parameters are supplied to the plotting processor, independent of the contents of the display list, and without retroaction on this latter. This makes it possible in particular to structure as a pipeline the different processors linked to a graphics display system.

As already mentioned in the preamble, the process according to the invention is particularly adapted to the optimization of the filling-in of overextending closed areas.

In fact the filling-in operation is generally performed by rereading the outlines, these latter having been stored with management of the parity of the number of points on each line or each column in accordance with the direction of scanning for filling-in.

Figure 9:
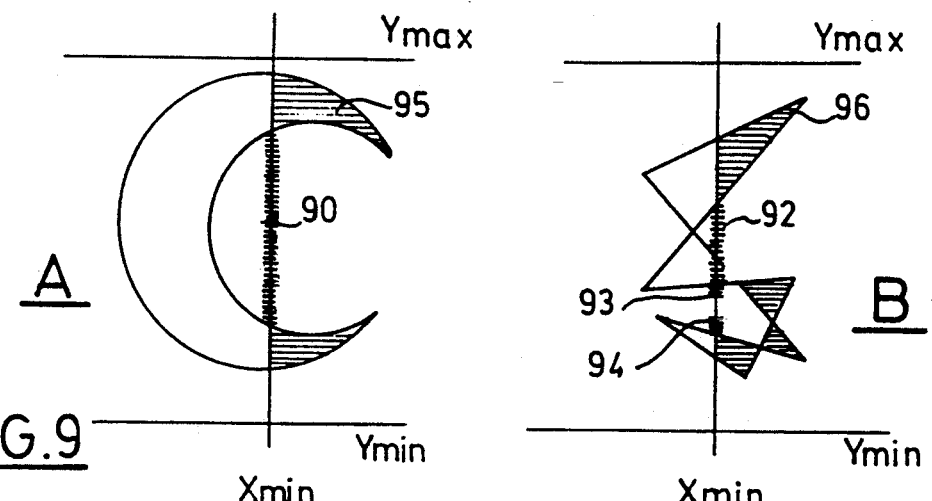
FIGS. 9A, 9B illustrate the adaptation of the process for plotting according to the invention, for the filling-in of overextending outlines.

Now, the process for projecting the overextending parts on the window border, as it is described here, ensures a storage of points with an "exclusive or" which ensures the parity check, and automates the filling-in of the visible parts of the areas inscribed within the outlines. (FIG. 9A, 9B)

The savings in processing time made possible by the process according to the invention, in comparison with the existing processes for systematic projection of all the overextending points, have likewise been calculated.

Figure 10A:
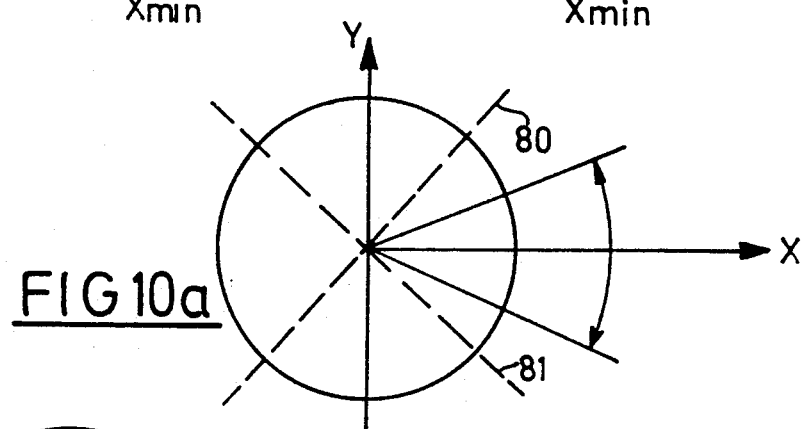
FIGS. 10A, 10B, 10C illustrate the processing time savings permitted by the process under the invention, in comparison with a technique for point-by-point projection of the overextending parts of the curve.

The number of points saved thanks to the process is calculated differently, for example in the case of the plotting of an overextending circle, for each of the quadrants delimited by the straight lines 80, 81 oriented at 45° and at 135° (FIG. 10A). These straight lines in fact delimit the zones for which the Y slopes are lower (or respectively higher) than the X slopes.

Figure 10B:
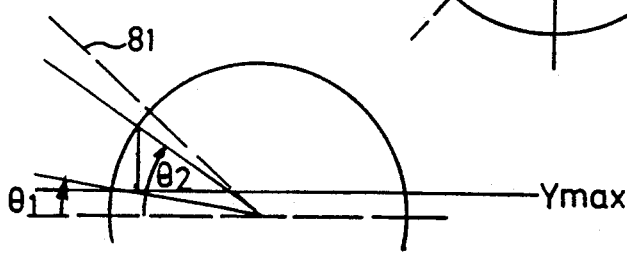

More precisely, the zones where one saves point calculations —owing to the fact of the automatic generation of crushed points with increments systematically parallel to the window border, in place of a point-by-point projection of the overextending curve—depend, in accordance with the direction of overextension, upon the comparison of the partial derivatives with respect to X and with respect to Y. In fact, under the diagonal 81 in FIG. 10B, the number of points that would be calculated in accordance with Jordan's method is expressed by:

$$NBT = R(\sin \theta_2 - \sin \theta_1),$$

owing to the fact that the method leads one to choose systematically an increment in Y,
while the number of crushed points calculated in accordance with the invention is:

$$NBE = R(\cos \theta_2 - \cos \theta_1)$$

since the crushed plotting is performed exclusively by increments in X.

The saving in the number of calculated points is therefore:

$$G = (NBT - NBE)*2.$$

Figure 10C:
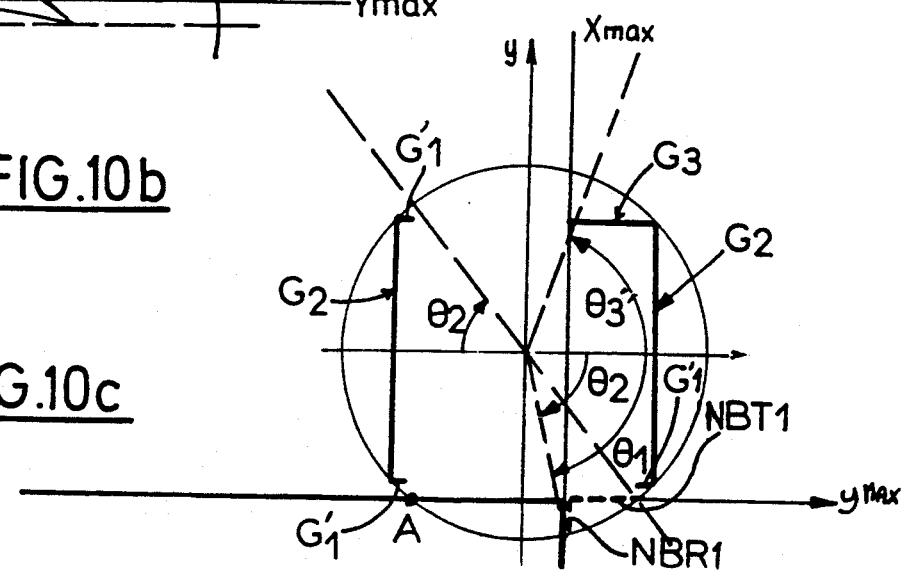

The example in FIG. 10C makes it possible to illustrate still further the obtained saving in calculation, in the case of an overextending circle that is traveled along in the trigonometric direction, and presenting different encountered cases:

Saving $G_1$: Zone of overextension, where the concavity is turned toward the inside (PLX=0).

Savings $G'_1$, $G_2$, $G_3$: Concentration of the overextending points at the window angle point.

Savings $G'_1$, $G_2$, $G'_1$: Zone of overextension where the concavity at the point of overstepping the window border is turned toward the outside. Furthermore, no crushed plotting is executed to the left of the point A of the return of the plotting inside the window.

The sum of these savings then makes it possible to obtain the total number of points saved:

$$GT = R(4..2^{\frac{1}{2}} - \cos\theta_3 - 3\cos\theta_2).$$

The process for plotting of overextending curves in accordance with the invention therefore not only ensures a decrease in the required memory capacities (owing to the fact of "blind" operation), but furthermore permits an acceleration in the processing time owing to the fact of the reduction of the number of calculated points.

TABLE I. DEFINITION OF ORIGINAL FUNCTION VARIABLES

\* PARAMETERS OF THE ORIGINAL FUNCTION

```
XC,YC         :INTEGER        ; *COORDONNEES DU CENTRE
X,Y           :INTEGER        ; *COORDONNEES DU PREMIER POINT
XF,YF         :INTEGER        ; *COORDONNEES DU POINT FINAL
DFX,DFY       :INTEGER        ; *DERIVEES PARTIELLES DU POINT
                                FINAL
CERCLE        :INTEGER        ; *TYPE DE PRIMITIVE
SENS          :INTEGER        ; *SENS DE PARCOURS POUR LE
                                CERCLE (ELLIPSE)
LSENS,NSENS:BOOLEAN           ; *VARIABLES LOGIQUES
                                CORRESPONDANTES
A,B,C,D:INTEGER               ; *PARAMETRES DE LA FONCTION
```

Key:
a. coordinates of the center
b. coordinates of the first point
c. coordinates of the final point
d. partial derivatives of the final point
e. type of original function
f. sens = direction
g. direction of travel for the circle (ellipse)
h. corresponding logical variables
i. parameters of the function

\* EXCURSION BETWEEN THE LIMIT POINTS

```
CAX,CAY       :INTEGER        ;
```

\* PARAMETERS OF THE WINDOW

```
XMIN,XMAX,YMIN,YMAX:INTEGER   ; *COORDONNEES DES
                                LIMITES
BXMIN,BXMAX   :INTEGER        ; *INDICATEURS DE
                                DEPASSEMENT DE X
BYMIN,BYMAX   :INTEGER        ; *INDICATEURS DE
                                DEPASSEMENT DE Y
```

Key:
a. coordinates of the boundaries
b. indicators of x passing beyond
c. indicators of y passing beyond

* SIGNS OF DERIVATIVES, AND CORRESPONDING LOGICAL VARIABLES

```
SDFX,SDFY           :INTEGER   ;
LSDFX,LSDFY         :BOOLEAN   ;
NSDFX,NSDFY         :BOOLEAN   ;
N1SDFX,N1SDFY       :BOOLEAN   ;
L1SDFX,L1SDFY       :BOOLEAN . ;
```

* COMPARISON OF THE SIGN OF THE PARTIAL DERIVATIVES BETWEEN THE THEORETICAL POINT AND THE PROJECTED POINT WHEN THE LATTER [sic] IS IN OVEREXTENSION

```
LPLX,LPLY           :BOOLEAN   ;
NPLX,NPLY           :BOOLEAN   ;
PLX,PLY             :INTEGER   ;
```

* SAME VARIABLES AT THE FINAL POINT

```
LPLXF,LPLYF         :BOOLEAN   ;
NPLXF,NPLYF         :BOOLEAN   ;
```

* VARIOUS VALUES OF THE ERROR FUNCTION

```
FF,FA,F2,F1,F3      :INTEGER   ;
```

* VARIOUS SIGNS OF THE FUNCTION

```
SF2                 :INTEGER   ;
LSFA,NSFA           :BOOLEAN   ;
```

* POSITION OF THE CURRENT POINT WITH REGARD TO THE FINAL POINT

```
LXFMX,LYFMY         :BOOLEAN   ;
NXFMX,NYFMY         :BOOLEAN   ;
```

* CONDITION OF CHANGE OF STATE OF THE VARIABLES PLX AND PLY

```
SAUT                :INTEGER   ;
LSAUX,LSAUY         :BOOLEAN   ;
NSAUX,NSAUY         :BOOLEAN   ;
```

Key:
a. saut = skip

* VALIDATION OF THE EXECUTION OF ONE PROGRAM STEP

UNPOINT              :BOOLEAN       ;

* INTERMEDIARY VARIABLES

SFX,SFY              :BOOLEAN       ;
    LX,LY                :BOOLEAN       ;
    FIN                  :BOOLEAN       ;

TABLE OF BRANCHINGS OF THE AUTOMATON AND CORRESPONDING INDEX:

TABRA                :TABLE         ;
    INDIC                :INTEGRER<sup>a</sup>    ;

Key:  a. integrate

* BRANCHING ADDRESS

BRAF2                :CHAR          ;
    CARAC                :CHAR          ;

TABLE II B [sic] * "EXCLUSIVE OR" PROCEDURE

PROCEDURE EOR(AA,BB:BOOLEAN;VAR CC:BOOLEAN) ;
    BEGIN
    CC:=(AA AND (NOT BB) OR ((NOT AA) AND BB)) ;
    END;

TABLE II A.  PROCEDURE FOR CALCULATION OF SIGN OF THE PARTIAL DERIVATIVES
EXTENDED TO THE CASE IN WHICH THESE LATTER ARE ZERO

[cercle = circle]
    PROCEDURE DERIVE ;
    BEGIN
    IF CERCLE THEN

POUR LE CERCLE ᵃ

BEGIN,

Key: a. for the circle 1.1. STORAGE IN MEMORY OF THE SIGNS OF THE PRECEDING DERIVATIVES

```
L1DFX:=LSDFX;
L1DFY:=LSDFY;
```

1.2. CALCULATION OF THE SIGN

[sens = direction]

```
EOR((DFY<0),(SENS=1),SFX);
EOR((DFX<0),(SENS=0),SFY);
LSDFX:=(DFX<0)OR((DFX= 0)AND SFX);
LSDFY:=(DFY<0)OR((DFY=0)AND SFY);
IF LSDFX THEN SDFX:=1 ELSE SDFX:=0;
IF LSDFY THEN SDFY:=1 ELSE SDFY:= 0;
NSDFX:=NOT LSDFX;
NSDFY:=NOT LSDFY;
```

1.3. DETECTION OF CHANGE OF SIGN OF THE PARTIAL DERIVATIVES

```
EOR (L1DFX,LSDFX,TSAUX);
EOR(L1DFY,LSDFY,TSAUY);
END
```

2. FOR A STRAIGHT LINE

```
ELSE
BEGIN
LSDFX:=(DFX<0);
NSDFX:=(DFX>=0);
LSDFY:=(DFY<0);
NSDFY:=(DFY>=0);
IF LSDFX THEN SDFX:=1 ELSE SDFX:=0
IF LSDFY THEN SDFY:=1 ELSE SDFY:=0;
TSAUX:=FALSE;
TSAUY:=FALSE;
END;
END;
```

TABLE III. INPUT OF DATA RELATING TO AN ~~ANTIDERIVATIVE~~ ORIGINAL FUNCTION: SEGMENT OF A STRAIGHT LINE OR ARC OF A CIRCLE

[cercle = circle]

```
1. BEGIN
READ(FIDATA,XMIN,XMAX,YMIN,YMAX);
READ(FIDATA,CERCLE,X,Y,XC,YC,XF,YF,SENS);
IF(NOT CERCLE)THEN Y:=YC;
IF(NOT CERCLE)THEN X:=XC;
IF CERCLE THEN
BEGIN
```

INITIALIZATIONS OF VARIABLES USEFUL FOR PLOTTING OF THE CIRCLE

2. CALCULATION OF THE DERIVATIVES AT THE POINT OF DEPARTURE

```
DFX:=2*A*(X-XC)+C*(Y-YC);
DFY:=2*B*(Y-YC)+C*(X-XC);
```

3. SIGN OF DERIVATIVES AT THE POINT OF DEPARTURE

```
DERIVE;
LX:=LSDFX;LY:=LSDFY;
```

4. PROJECTION OF THE POINT OF DEPARTURE IN OVEREXTENSION

```
IF(X>=XMAX)THEN X:=XMAX     ;
IF(Y>=YMAX)THEN Y:=YMAX     ;
IF(Y<=YMIN)THEN Y:=YMIN     ;
IF(X<=XMIN)THEN X:=XMIN     ;
```

5. CALCULATION OF THE VALUE OF THE FUNCTION AT THE POINT OF DEPARTURE

```
FA: (A*(X-XC)*(X-XC)+B*(Y-YC)*(Y-YC)+C*(X-XC)*(Y-YC));
```

6. CALCULATION OF THE DERIVATIVES AT THE PROJECTED POINT OF DEPARTURE

```
DFX:=2*A*(X-XC)+C*(Y-YC)    ;
DFX:=2*B*(Y-YC)+C*(X-XC)    ;
```

7. SIGN OF THE DERIVATIVES AT THE PROJECTED POINT OF DEPARTURE

DERIVE;

8. INITIALIZATION OF THE VARIABLES PLX AND PLY

```
EOR(LX,LSDFX,LPLX);
EOR(LY,LSDFY,LPLY);
IF LPLX THEN PLX:=1 ELSE PLX:=0;
IF LPLY THEN PLY:=1 ELSE PLY:=0;
```

TABLE III B. TAKING INTO ACCOUNT OF THE FINAL CONDITIONS

1. CALCULATION OF THE PARTIAL DERIVATIVES

```
DFX:=2*A*(XF-XC)+C*(YF-YC) ;
DFY:=2*B*(YF-YC)+C*(XF-XC) ;
```

2. UPDATING OF THE VALUE OF THE FUNCTION

```
FF:=A*(XF-XC)*(XF-XC)+B*(YF-YC)*(YF-YC)+C*(XF-XC)*(YF-YC);
FA:=FA-FF;
UNPOINT:=FALSE;
```

3. SIGN OF THE PARTIAL DERIVATIVES

```
DERIVE
LX:=LSDFX;LY:=LSDFY;
```

4. PROJECTION OF THE FINAL POINT IF IT IS IN OVEREXTENSION

```
IF(XF>=XMAX)THEN XF:=XMAX;
IF(YF>=YMAX)THEN YF:=YMAX;
IF(XF<=XMIN)THEN XF:=XMIN;
IF(YF<=YMIN)THEN YF:=YMIN;
```

5. CALCULATION OF THE PROJECTED[1] PARTIAL DERIVATIVES

```
DFX:=2*A*(XF-XC)+C*(YF-YC);
DFY:=2*B*(YF-YC)+C*(XF-XC);
```

6. SIGN OF THE PARTIAL DERIVATIVES AT THE PROJECTED POINT
DERIVE:

CALCULATION OF THE VARIABLES PLXF AND PLYF

```
EOR(LX,LSDFX;LPLXF);
EOR(LY,LSDFY;LPLYF);
IF LPLXF THEN PLXF:=1 ELSE PLXF:=0;
IF LPLYF THEN PLYF:=1 ELSE PLYF:=0;
```

7. CALCULATION OF THE EXCURSION OF THE COORDINATES

```
CAY:=Y-YF;
CAX:=X-XF;
```

8. INITIALIZATION OF THE DERIVATIVES FOR THE FIRST POINT

```
DFX:=2*A*(X-XC)+C*(Y-YC);
DFY:=2*B*(Y-YC)+C*(X-XC);
END
```

ELSE

TABLE III C. INITIALIZATION OF THE PARAMETERS THAT ARE USEFUL FOR PLOTTING OF A STRAIGHT LINE

```
BEGIN
1.DFX:=-(YF-YC);
DFY:=XF-XC;
2.IF (X>=XMAX)THEN X:=XMAX;
IF (XF>=XMAX)THEN XF:=XMAX;
IF (YF>=YMAX)THEN YF:=YMAX;
IF (Y>=YMAX)THEN Y:=YMAX;
IF (YF<=YMIN)THEN YF:=YMIN;
IF (Y<=YMIN)THEN Y:=YMIN;
IF (XF<=XMIN)THEN XF:=XMIN;
IF (X<=XMIN)THEN X:=XMIN;
FA:=(X-XC)*DFX+(Y-YC)*DFY;
3.CAX:=X-XF;
CAY:=Y-YF;
PLXF:=0; PLYF:=0; UNPOINT:=FALSE;
END;
```

---

[1] [Translator's Note: Reading "PROJETE" as a typographical error for "PROJETEES."]

TABLE IV. GENERATION OF THE POINTS — ORIGINAL FUNCTION

REPEAT
BEGIN

1. CALCULATION OF THE LOGICAL VARIABLES THAT DETERMINE THE STATE OF THE AUTOMATON FOR CALCULATION OF THE POINTS

1.1. DETERMINATION OF THE COORDINATES IN OVEREXTENSION

```
LXMAX:=(X>=XMAX);
LYMAX:=(Y>=YMAX);
LXMIN:=(X<=XMIN);
LYMIN:=(Y<=YMAX);
```

1.2. SIGNS OF THE PARTIAL DERIVATIVES AND OF THE FUNCTION

```
DERIVE.
LSFA:=(FA<0);
NSFA:=(FA>=0);
```

1.3. VARIABLES PLX AND PLY

```
LPLX:=(PLX=1);
NPLX:=(PLX=0);
LPLY:=(PLY=1);
NPLY:=(PLY=0);
```

1.4. POSITION OF THE CURRENT POINT WITH REGARD TO THE FINAL POINT

[sens = direction]

```
NXFMX:=XF<=X;
LXFMX:=XF>=X;
NYFMY:=YF<=Y;
LYFMY:=YF>=Y;
LSENS:=(SENS=1);
NSENS:=(SENS=0);
```

2. RETROGRESSION CONDITION

[sens = direction]

2.1. LSAUX:-NSFA AND LXMAX AND LSDFX
     AND ((NSENS AND LPLX AND L1SDFY AND LYFMY)
          OR(NSENS AND NPLX AND N1SDFY AND NYFMY)
          OR(LSENS AND LPLX AND N1SDFY AND NYFMY)
          OR (LSENS AND NPLX AND L1SDFY AND LYFMY))
     OR NSFA AND LXMIN AND NSDFX
          AND ((NSENS AND NPLX AND L1SDFY AND LYFMY)
          OR(NSENS AND LPLX AND N1SDFY AND NYFMY)
          OR(LSENS AND NPLX AND N1SDFY AND NYFMY))
          OR(LSENS AND LPLX AND L1SDFY AND LYFMY))
     OR LPLX AND ((LXMAX AND NSDFX)OR(LXMIN AND LSDFX));
LSAUY:-NSFA AND LYMAX AND LSDFY
     AND ((NSENS AND NPLY AND L1SDFX AND LXFMX)
          OR(NSENS AND LPLY AND N1SDFX AND NXFMX)
          OR(LSENS AND NPLY AND N1SDFX AND NXFMX)
          OR(LSENS AND LPLY AND L1SDFX AND LXFMX))
     OR NSFA AND LYMIN AND NSDFY
          AND ((NSENS AND LPLY AND L1SDFX AND LXFMX)
          OR (NSENS AND NPLY AND N1SDFX AND NXFMX)
          OR (LSENS AND LPLY AND N1SDFX AND NXFMX)
          OR (LSENS AND NPLY AND L1SDFX AND LXFMX));
     OR LPLY AND ((LYMAX AND NSDFY)OR(LYMIN AND LSDFY));

2.2. LSAUX:-LSAUX OR(TSAUX AND(LXMAX OR LXMIN)AND UNPOINT);
LSAUY:-LSAUY OR(TSAUY AND(LYMAX OR LYMIN)AND UNPOINT);

2.3. UPDATING OF VARIABLES PLX OR PLY

EOR(LPLX,LSAUX,LPLX);
EOR(LPLY,LSAUY,LPLY);
IF LPLX THEN PLX:-1 ELSE PLX:-0;
IF LPLY THEN PLY:-1 ELSE PLY:-0;
IF(LSAUX OR LSAUY)THEN SAUT:-1 ELSE SAUT:-0
IF LXMAX THEN BXMAX:-1 ELSE BXMAX:-0;
IF LYMAX THEN BYMAX:-1 ELSE BYMAX:-0;
IF LYMIN THEN BYMIN:-1 ELSE BYMIN:-0;
IF LXMIN THEN BXMIN:-1 ELSE BXMIN:-0;

3. CALCULATION OF THE INDEX, THEN OF THE CORRESPONDING STATE OF THE AUTOMATON

INDIC:-PLX*256+PLY*128+64*BXMIN+32*BXMAX+16*BYMIN+8*BYMAX+
       SDFY*4+SDFX*2+SENS+512*SAUT;
BRAF2:-TABRA(INDIC);

TABLE V. PRESENTATION OF THE CALCULATIONS EXECUTED IN THE DIFFERENT BRANCHES OF THE AUTOMATON

TABLE V.0
```
         CASE BRAF2 OF
         '0':BEGIN
         IF NOT UNPOINT THEN UNPOINT:=NOT UNPOINT;
         F2:=FA+DFX-DFY+A+B-C;
         IF F2>0 THEN
         BEGIN
         F1:=F2-DFX-A+C;
         IF ((F1+F2) 0) THEN
                 BEGIN
                 FA:=F2;
                 DFX:=DFX+2*A;
                 DFY:=DFY+C;
                 X:=X+1;CAX:=CAX+1;
                 END
                 ELSE
                 FA:=F1;
                 DFY:=DFY-2*B;
                 DFX:=DFX-C;
                 Y:=Y-1;CAY:=CAY-1;
                 END
         ELSE BEGIN
                 F3:=F2+DFY-B+C;
                 IF ((F2+F3)>=0) THEN
                 BEGIN
                 FA:=F2
                 DFY:=DFY-2*B;
                 DFX:=DFX-C;
                 Y:=Y-1 ;CAY:=CAY-1;
                 END
                 ELSE
                 FA:=F3;
                 DFX:=DFX+2*A;
                 DFY:=DFY+C;
                 X:=X+1;CAX:=CAX+1
                 END;
END;
```

TABLE V.1.
```
         '1':BEGIN
IF NOT UNPOINT THEN UNPOINT:=NOT UNPOINT.
F2:=FA-DFX+DFY+A+B-C;
    IF F2>0 THEN
                 BEGIN
                 F1:=F2-DFY-B+C;
                 IF ((F1+F2)<0) THEN
                         BEGIN
                         FA:=F2;
                         DFY:=DFY+2*B;
                         DFX:=DFX+C;
                         Y:=Y+1;CA:=CAY+1;
```

```
                END
                ELSE
                   FA:=F1;
                   DFX:=DFX-2*A;

DFY:=DFY-C;
                   X:=X-1;CAX:=CAX-1;
                   END
              ELSE BEGIN
                   F3:=F2+DFX-A+C;
                   IF ((F2+F3)>=0) THEN
                   BEGIN
                      FA:=F2;
                      DFX:=DFX-2*A;
                      DFY:=DFY-C;
                      X:=X-1;CAX:=CAX-1;
                      END
                   ELSE
                      FA:=F3;
                      DFY:=DFY+2 B;
                      DFX:=DFX+C;
                      Y:=Y+1;CAY:=CAY+1;
                      END;
END;

TABLE V.2   '2':BEGIN
      IF NOT UNPOINT THEN UNPOINT:=NOT UNPOINT;
      F2:=FA+DFX+DFY+A+B+C;
            IF F2>0 THEN
                 BEGIN
                 F1:=F2-DFY-B-C;
                 IF ((F1+F2)<0) THEN
                       BEGIN
                       FA:=F2;
                       DFY:=DFY+2*B;
                       DFX:=DFX+C;
                       Y:=Y+1;CAY:=CAY+1;
                       END
                  ELSE
                       FA:=F1;
                 DFX:=DFX+2*A;
                 DFY:=DFY+C;
                 X:=X+1;CAX:=CAX+1;
            ELSE BEGIN
                 F3:=F2-DFX-A-C;
                 IF ((F2+F3)>=0) THEN
                       BEGIN
                       FA:=F2;
                       DFX:=DFX+2*A;
                       DFY:=DFY+C;
                       X:=X+1;CAX:=CAX+1;
                       END
```

```
                    ELSE
                        FA:=F3;
            DFY:=DFY+2*B;
            DFX:=DFX+C;
            Y:=Y+1;CAY:=CAY+1;
            END;
END;
```

TABLE V.3. '3';BEGIN
```
    IF NOT UNPOINT THEN UNPOINT:=NOT UNPOINT;
    F2:=FA-DFX-DFY+A+B+C;

IF F2>0 THEN
            BEGIN
            F1:=F2+DFX-A-C;
            IF ((F2+F1)<=0) THEN
                    BEGIN
                    FA:=F2;
                    DFX:=DFX-2*A;
                    DFY:=DFY-C;
                    X:=X-1; CAX:=CAX-1;
                    END
                    ELSE
                    FA:=F1.
            DFY:=DFY-2*B;
                DFX:=DFX-C;
            Y:=Y-1;CAY:=CAY-1;
            END
        ELSE BEGIN
            F3:=F2+DFY-B-C;
            IF ((F2+F3)>=0) THEN
            BEGIN
            FA:=F2;
            DFY:=DFY-2*B;
                DFX:=DFX-C;
                Y:=Y-1; CAY:=CAY-1;
                END
                ELSE
                FA:=F3;
                DFX:=DFX-2*A;
                DFY:=DFY-C;
                X:=X-1; CAX:=CAX-1;
                END;
END;
```

TABLE V.4. '4'BEGIN
```
    IF NOT UNPOINT THEN UNPOINT:=NOT UNPOINT;
    F2:=FA-DFX-DFY+A+B+C;
        IF F2>0 THEN
                BEGIN
```

```
                F1:=F2+DFY-B-C;
                IF ((F1+F2)<0) THEN
                    BEGIN
                    FA:=F2;
                    DFY:=DFY-2*B;
                    DFX:=DFX-C;
                    Y:=Y-1;CAY:=CAY-1;
                    END
                ELSE
                    BEGIN
                    FA:=F1;
                    END
            DFX:=DFX-2*A;
            DFY:=DFY-C;
            X:=X-1;CAX:=CAX-1;
            END
        ELSE BEGIN

F3:=F2+DFX-A-C;
            IF ((F2+F3)>=0) THEN
                    BEGIN
                    FA:=F2;
                    DFX:=DFX-2*A;
                    DFY:=DFY-C;
                    X:=X-1; CAX:=CAX-1;
                    END
                ELSE
                    BEGIN
                    FA:=F3;
                    END;
            DFY:=DFY-2*B;
                DFX:=DFX-C;
            Y:=Y-1;CAY:=CAY-1;
            END;
END;

TABLE V.5_ '5';BEGIN
    IF NOT UNPOINT THEN UNPOINT :=NOT UNPOINT;
    F2:=FA+DFX+DFY+A+B+C;
        IF F2>0 THEN
            BEGIN
            F1:=F2-DFX-A-C;
            IF ((F2+F1)<=0) THEN
                    BEGIN
                    FA:=F2;
                    DFX:=DFX+2*A;
                    DFY:=DFY+C;
                    X:=X+1;CAX:=CAX+1;
                    END
                ELSE
                    FA:=F1;
            DFY:=DFY+2*B;
                DFX:=DFX+C;
                Y:=Y+1; CAY:=CAY+1;
```

```
            END
    ELSE BEGIN
        F3:=F2-DFY-B-C;
        IF ((F2+F3)>=0) THEN
            BEGIN
            FA:=F2;
            DFY:=DFY+2*B;
            DFX:=DFX+C;
            Y:=Y+1; CAY:=CAY+1;
            END
            ELSE
            FA:=F3;
        DFX:=DFX+2*A.
        DFY:=DFY+C;
        X:=X+1;CAX:=CAX+1
        END;
END;

TABLE V.6.   '6'BEGIN
    IF NOT UNPOINT THEN UNPOINT:=NOT UNPOINT;
    F2:=FA-DFX+DFY+A+B-C;
        IF F2>0 THEN

BEGIN
            F1:=F2+DFX-A+C;
            IF ((F2+F1)<=0) THEN
                BEGIN
                FA:=F2;
                DFX:=DFX-2*A;
                DFY:=DFY-C;
                X:=X-1;CAX:=CAX-1
                END
                ELSE
                FA:=F1;
            DFY:=DFY+2*B;
            DFX:=DFX+C;
            Y:=Y+1; CAY:=CAY+1;
            END
        ELSE BEGIN
            F3:=F2-DFY-B+C;
            IF ((F2+F3)>=0) THEN
                BEGIN
                FA:=F2;
                DFY:=DFY+2*B;
                DFX:=DFX+C;
                Y:=Y+1;CAY:=CAY+1;
                END
                ELSE
                FA:F3;
                DFX:=DFX-2*A;
                DFY:=DFY-C;
            X:=X-1;CAX:=CAX-1;
            END;
END;
```

TABLE V.7. '7':BEGIN
```
       IF NOT UNPOINT THEN UNPOINT:=NOT UNPOINT;
       F2:=FA+DFX-DFY+A+B-C;
       IF F2>0 THEN
                    BEGIN
                    F1:=F2+DFY-B+C;
                    IF ((F2+F1)<=0) THEN
                           BEGIN
                           FA:=F2;
                           DFY:=DFY-2*B;
                           DFX:=DFX-C;
                           Y:=Y-1; CAY:=CAY-1;
                           END
                           ELSE
                           FA:=F1;
                    DFX:=DFX+2*A;
                    DFY:=DFY+C;
                    X:=X+1;CAX:=CAX+1;
                    END
              ELSE BEGIN
                    F3:=F2-DFX-A+C;
                    IF ((F2+F3)>=0) THEN
                           BEGIN
                           FA:=F2;

DFX:=DFX+2*A;
                           DFY:=DFY+C;
                           X:=X+1;CAX:=CAX+1;
                           END
                           FA:=F3;
                    DFY:=DFY-2*B;
                           DFX:=DFX-C;
                    Y:=Y-1;CAY:=CAY-1;
                    END
END;
```

TABLE V.8. '8':BEGIN
```
IF NOT UNPOINT THEN UNPOINT:=NOT UNPOINT);
FA:=FA+DFX+A;
X:=X+1;CAX:=CAX+1;
DFX:=DFX+2*A;
DFY:=DFY+C;
      END;
```

TABLE V.9. '9':BEGIN
```
IF NOT UNPOINT THEN UNPOINT:=NOT UNPOINT;
FA:=FA-DFX+A;
X:=X-1;CAX:=CAX-1;
DFX:=DFX-2*A;
DFY:=DFY-C;
      END;
```

TABLE V.10. 'A':BEGIN
IF NOT UNPOINT THEN UNPOINT:=UNPOINT
FA:=FA-DFY+B;
Y:=Y-1;CAY:=CAY-1;
DFY:=DFY-2*B;
DFX:=DFX-C;
    END;

TABLE V.11. 'B':BEGIN
IF NOT UNPOINT THEN UNPOINT:=NOT UNPOINT;
FA:=FA+DFY+B;
Y:=Y+1;CAY:=CAY+1;
DFY:=DFY+2*B;
DFX:=DFX+C;
    END;

TABLE V.12. 'C':BEGIN
LPLX:=NOT LPLX;
IF LPLX THEN PLX:=1 ELSE PLX:=0;
    END;

TABLE V.13. 'D':BEGIN
LPLY:=NOT LPLY;
IF LPLY THEN PLY:=1 ELSE PLY:=0;
    END;

TABLE V.14. 'E':BEGIN
LPLX:=NOT LPLX;
LPLY:=NOT LPLY;
IF LPLX THEN PLX:=1 ELSE PLX:=0;
IF LPLY THEN PLY:=1 ELSE PLY:=0;
FIN:=TRUE;
    END;

TABLE V.15. 'F':WRITELN ('CAS IMPOSSIBLE '.X,Y,INDIC,BRAF2);

Key:  a.  "impossible case"

TABLE V.16. 'G':WRITELN ('PROCEDURE DE REBROUSSEMENT VALIDEE');
        END;
END;

Key:  a.  "retrogression procedure validated"

TABLE VI. VERIFICATION DU CRITERE D'ARRET

UNTIL (CAX=0)AND(CAY=0)AND(UNPOINT)AND(((PLXF=PLX)AND(PLYF=PLY))OR FIN);
WRITELN('CRITERE DE FIN ATTEINT');
END;
END.

Key:  a.  "end criterion reached"

We claim:

1. A process for plotting a curve to be displayed on a display window of a graphics terminal, comprising the steps of:
    defining the display window with boundary parameters;
    identifying a geometric function representing at least a portion of the curve having an overextending part extending beyond boundaries of the display window;
    representing said portion of the curve with a display list having coordinates of characteristic points of said portion;
    comparing coordinates of a plotting point on said portion of the curve with said boundary parameters to determine of the plotting point is on the overextending part;
    plotting said portion of the curve point by point and incrementally when the plotting point is not on the overextending part, by calculating calculated points by adding to the coordinates of the plotting point first increments and determining which of said calculated points is closest to a corresponding one of said characteristic points;
    plotting said portion of the curve when the plotting point is on the overextending part by generating second increments independently of said calculated points closest to the curve and producing border points therefrom so as to plot the overextending part in a direction along said boundaries of the display window.

2. A process for plotting a curve according to claim 1, further comprising the step of:
    calculating, in response to said border points, criteria for controlling the direction of said plotting along said boundaries.

3. A process for plotting a curve according to claim 1, wherein said overextending part comprises a concavity opening away from said display window, and further comprising the steps of:
    distinguishing between opposite sides of an extremum of said concavity;
    providing concavity flags and assigning different values to said concavity flags according to which side of said extremum the corresponding coordinates of a particular point of said overextending part would lie on; and
    utilizing said flags to distinguish between points of said concavity which would have duplicate points of projection onto a boundary of said display window.

4. A process for plotting a curve according to claim 3, wherein said determining step comprises the step of:
    comparing coordinates and concavity flags of each point of said concavity with coordinates and concavity flags of a final point of said overextending part.

5. A process for plotting a curve according to claim 4, and further comprising the step of:
    determining reaching of said retrogression thresholds as a function of said concavity opening away from said display window, of said concavity flags, and of relative positioning between a particular point and a final point.

6. A process for plotting a curve according to claim 3, and further comprising the steps of:
    determining reaching of said resumption thresholds by detecting when one of said second particular increments causes the plotting of said overextending part to be directed toward said display window and a concavity flag corresponding to said second particular increment indicates that said second particular increment is on a side of a concavity extremum which is closest to said display window; and
    resuming plotting of said portion inscribed inside said display window in response to reaching said resumption threshold.

7. A process of plotting a curve according to claim 6, and further comprising the step of:
    assigning a value to an algebraic equation of said overextending part such that said final point if said overextending part coincides with a corresponding border point in order to determine reaching of said stopping threshold.

8. A process for plotting a curve according to claim 3, wherein said portion is overextended relative to two boundaries defining a corner of said display window, and further comprising the steps of:
    plotting a unique border point at said corner; and
    limiting further processing, after plotting said unique border point, to immediate updating of said concavity flag values.

9. A process for plotting a curve according to claim 1, wherein the overextending part of said geometric portion is continuous from a point of exit from said window to a point of reentry into said window, and further comprising the step of:
    plotting only said border points extending between and sufficient for joining said exit and reentry points.

10. A process for plotting a curve according to claim 1, wherein calculating of said first increments comprises the steps of:
    applying at least an increment to each coordinate of the plotting point for obtaining three possible points from which a new plotting point is selectable;
    determining a direction of travel along said portion and in which quadrant said plotting point is located, said quadrant being one of four possible quadrants defined by combinations of two signs of each partial derivative with respect to the geometric type of said portion;
    eliminating one of said three possible points by applying the Bresenham method;
    selecting the new plotting point from the other two of said three possible points in accordance with the Jordan method.

11. Apparatus for plotting a curve to be displayed on a display window of a graphics terminal, said display window having boundaries, the apparatus comprising:
    defining means for defining said display window with boundary parameters;
    identification means for identifying a geometric function representing at least a portion of the curve having an overextending part extending beyond the boundaries of the display window;
    storage means for storing a display list of said portion having coordinates of characteristic points; and
    plotting means responsive to said defining means, said identification means and said storage means for plotting said portion point by point and incrementally by adding first increments to stored coordinates of a plotting point and then calculating a plurality of calculated points and determining which of said calculated points is closest to a corresponding one of said characteristic points;

wherein said plotting means comprises:

comparator means for comparing coordinates of said plotting point with said boundary parameters to determine if the plotting point is part of the overextending part, generating means responsive to said storage means and said generating means for determining the reaching of any one of stopping, retrogression, and resumption thresholds, and control means responsive to said determining means for stopping said plotting of border points.

12. An apparatus for plotting a curve according to claim 11, further comprising:

second storage means for storing coordinates of a final point of said geometric portion;

relative position determining means responsive to said plotting means and said second storage means for determining a relative position of the plotting point with regard to the final point.

* * * * *